(12) United States Patent
Lesso

(10) Patent No.: US 11,735,189 B2
(45) Date of Patent: Aug. 22, 2023

(54) SPEAKER IDENTIFICATION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

(*) Notice: Subject to any disclaimer, the term of this patent is extended or adjusted under 35 U.S.C. 154(b) by 34 days.

(21) Appl. No.: 16/255,390

(22) Filed: Jan. 23, 2019

(65) Prior Publication Data
US 2019/0228778 A1 Jul. 25, 2019

Related U.S. Application Data

(63) Continuation-in-part of application No. 15/877,660, filed on Jan. 23, 2018, now Pat. No. 11,264,037.

(60) Provisional application No. 62/733,755, filed on Sep. 20, 2018.

(30) Foreign Application Priority Data

Jun. 8, 2018 (GB) ...................................... 1809474

(51) Int. Cl.
*G10L 17/06* (2013.01)
*G10L 17/04* (2013.01)
*G10L 17/00* (2013.01)

(52) U.S. Cl.
CPC .............. *G10L 17/06* (2013.01); *G10L 17/00* (2013.01); *G10L 17/04* (2013.01)

(58) Field of Classification Search
CPC ... G10L 15/22; G10L 17/00; G10L 2025/786; G06F 21/32
See application file for complete search history.

(56) References Cited

U.S. PATENT DOCUMENTS

| 5,197,113 A | 3/1993 | Mumolo |
| 5,568,559 A | 10/1996 | Makino |
| 5,710,866 A | 1/1998 | Alleva et al. |
| 5,787,187 A | 7/1998 | Bouchard et al. |

(Continued)

FOREIGN PATENT DOCUMENTS

| AU | 2015202397 B2 | 5/2015 |
| CN | 1497970 A | 5/2004 |

(Continued)

OTHER PUBLICATIONS

International Search Report and Written Opinion of the International Searching Authority, International Application No. PCT/GB2019/052302, dated Oct. 2, 2019.

(Continued)

*Primary Examiner* — Mark Villena
(74) *Attorney, Agent, or Firm* — Jackson Walker L.L.P.

(57) ABSTRACT

A method of speaker identification comprises receiving an audio signal representing speech; performing a first voice biometric process on the audio signal to attempt to identify whether the speech is the speech of an enrolled speaker; and, if the first voice biometric process makes an initial determination that the speech is the speech of an enrolled user, performing a second voice biometric process on the audio signal to attempt to identify whether the speech is the speech of the enrolled speaker. The second voice biometric process is selected to be more discriminative than the first voice biometric process.

20 Claims, 15 Drawing Sheets

(56) References Cited

U.S. PATENT DOCUMENTS

| | | |
|---|---|---|
| 5,838,515 A | 11/1998 | Mortazavi et al. |
| 6,182,037 B1 | 1/2001 | Maes |
| 6,229,880 B1 | 5/2001 | Reformato et al. |
| 6,249,237 B1 | 6/2001 | Prater |
| 6,343,269 B1 | 1/2002 | Harada et al. |
| 6,480,825 B1 | 11/2002 | Sharma et al. |
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,577,046 B2 | 11/2013 | Aoyagi |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Velius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 | 11/2016 | Kons et al. |
| 9,548,979 B1 | 1/2017 | Johnson et al. |
| 9,600,064 B2 | 3/2017 | Lee et al. |
| 9,613,640 B1 | 4/2017 | Balamurali et al. |
| 9,641,585 B2 | 5/2017 | Kvaal et al. |
| 9,646,261 B2 | 5/2017 | Agrafioti et al. |
| 9,659,562 B2 | 5/2017 | Lovitt |
| 9,665,784 B2 | 5/2017 | Derakhshani et al. |
| 9,865,253 B1 | 1/2018 | De Leon et al. |
| 9,984,314 B2 | 5/2018 | Philipose et al. |
| 9,990,926 B1 | 6/2018 | Pearce |
| 10,032,451 B1 * | 7/2018 | Mamkina ............... G10L 15/26 |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,339,290 B2 | 7/2019 | Valendi et al. |
| 10,460,095 B2 | 10/2019 | Boesen |
| 10,467,509 B2 | 11/2019 | Albadawi et al. |
| 10,692,492 B2 | 6/2020 | Rozen et al. |
| 10,733,987 B1 * | 8/2020 | Govender ............... G10L 17/22 |
| 10,847,165 B2 | 11/2020 | Lesso |
| 10,915,614 B2 | 2/2021 | Lesso |
| 10,977,349 B2 | 4/2021 | Suh et al. |
| 11,017,252 B2 | 5/2021 | Lesso |
| 11,023,755 B2 | 6/2021 | Lesso |
| 11,037,574 B2 | 6/2021 | Lesso |
| 11,051,117 B2 | 6/2021 | Lesso |
| 11,164,588 B2 | 11/2021 | Alonso et al. |
| 11,276,409 B2 | 3/2022 | Lesso |
| 2002/0169608 A1 | 11/2002 | Tamir et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 | 9/2003 | Kanazawa et al. |
| 2003/0182119 A1 | 9/2003 | Junqua et al. |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1 | 10/2007 | Lindsay |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1 | 9/2009 | Miller |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0106502 A1 | 4/2010 | Farrell et al. |
| 2010/0106503 A1 | 4/2010 | Farrell et al. |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0075857 A1 | 3/2011 | Aoyagi |
| 2011/0142268 A1 | 6/2011 | Iwakuni et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 | 9/2012 | Visser et al. |
| 2012/0249328 A1 * | 10/2012 | Xiong ................... G10L 15/22 |
| | | 340/541 |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0132091 A1 | 5/2013 | Skerpac |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford et al. |
| 2013/0289999 A1 | 10/2013 | Hymel |
| 2014/0059347 A1 | 2/2014 | Dougherty et al. |
| 2014/0149117 A1 | 5/2014 | Bakish et al. |
| 2014/0172430 A1 * | 6/2014 | Rutherford ............ G06Q 20/32 |
| | | 704/273 |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2014/0358353 A1 | 12/2014 | Ibanez-Guzman et al. |
| 2015/0006163 A1 | 1/2015 | Liu et al. |
| 2015/0028996 A1 | 1/2015 | Agrafioti et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 * | 6/2015 | North ..................... G06F 21/32 |
| | | 726/5 |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcek et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1 | 1/2016 | Boczek |
| 2016/0066113 A1 | 3/2016 | Elkhatib et al. |
| 2016/0071275 A1 | 3/2016 | Hirvonen |
| 2016/0071516 A1 | 3/2016 | Lee et al. |

(56) References Cited

U.S. PATENT DOCUMENTS

| | | |
|---|---|---|
| 2016/0086607 A1 | 3/2016 | Aley-Raz et al. |
| 2016/0086609 A1 | 3/2016 | Yue et al. |
| 2016/0111112 A1* | 4/2016 | Hayakawa .............. G10L 25/45 |
| | | 704/239 |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1 | 5/2016 | Khitrov et al. |
| 2016/0182998 A1 | 6/2016 | Galal et al. |
| 2016/0210407 A1 | 7/2016 | Hwang et al. |
| 2016/0217321 A1 | 7/2016 | Gottlieb |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1* | 7/2017 | Bocklet ................. G10L 17/02 |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1* | 12/2017 | Aviles-Casco Vaquero ................ |
| | | G06F 3/167 |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1* | 7/2018 | Lindemann ........... G06F 3/0647 |
| 2018/0197525 A1 | 7/2018 | Kikuhara et al. |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0330727 A1 | 11/2018 | Tulli |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0352332 A1 | 12/2018 | Tao |
| 2018/0358020 A1 | 12/2018 | Chen et al. |
| 2018/0366124 A1 | 12/2018 | Cilingir et al. |
| 2018/0374487 A1 | 12/2018 | Lesso |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1* | 2/2019 | Huang .................... G10L 17/26 |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1* | 6/2019 | Kovvali .................... G01S 3/80 |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0287536 A1 | 9/2019 | Sharifi et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1 | 10/2019 | Aumer et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1* | 12/2019 | Lin ......................... G10L 25/21 |
| 2019/0372969 A1 | 12/2019 | Chang et al. |
| 2019/0373438 A1 | 12/2019 | Amir et al. |
| 2019/0392145 A1* | 12/2019 | Komogortsev ......... G06F 21/32 |
| 2019/0394195 A1 | 12/2019 | Chari et al. |
| 2020/0035247 A1 | 1/2020 | Boyadjiev et al. |
| 2020/0204937 A1 | 6/2020 | Lesso |
| 2020/0227071 A1 | 7/2020 | Lesso |
| 2020/0265834 A1 | 8/2020 | Lesso et al. |
| 2020/0286492 A1 | 9/2020 | Lesso |
| 2021/0303669 A1 | 9/2021 | Lesso |
| 2022/0382846 A1 | 12/2022 | Koshinaka et al. |

FOREIGN PATENT DOCUMENTS

| | | |
|---|---|---|
| CN | 1937955 A | 3/2007 |
| CN | 101228787 A | 7/2008 |
| CN | 102246228 A | 11/2011 |
| CN | 103109495 A | 5/2013 |
| CN | 104252860 A | 12/2014 |
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 107251573 A | 10/2017 |
| EP | 1205884 A2 | 5/2002 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |

(56) References Cited

FOREIGN PATENT DOCUMENTS

| | | | |
|---|---|---|---|
| EP | 2860706 A2 | 4/2015 |
| EP | 3016314 A1 | 5/2016 |
| EP | 3156978 A1 | 4/2017 |
| EP | 3466106 A1 | 4/2019 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 0208147 A1 | 10/2002 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019002831 A1 | 1/2019 |

OTHER PUBLICATIONS

Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.

Li, Lantian et al., "A Study on Replay Attack and Anti-Spoofing for Automatic Speaker Verification", INTERSPEECH 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al., "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.

(56) References Cited

OTHER PUBLICATIONS

Zhang et al., DolphinAttack: Inaudible Voice Commands, Retrieved from Proceedings of the 2017 ACM SIGSAC Conference on Computer and Communications Security, Aug. 2017.

Song, Liwei, and Prateek Mittal, Poster: Inaudible Voice Commands, Proceedings of the 2017 ACM SIGSAC Conference on Computer and Communications Security, Aug. 2017.

Fortuna, Andrea, [Online], DolphinAttack: inaudiable voice commands allow attackers to control Siri, Alexa and other digital assistants, Sep. 2017.

Lucas, Jim, What is Electromagnetic Radiation?, Mar. 13, 2015, Live Science, https://www.livescience.com/38169-electromagnetism.html, pp. 1-11 (Year: 2015).

Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.

First Office Action, China National Intellectual Property Administration, Patent Application No. 2018800418983, dated May 29, 2020.

International Search Report and Written Opinion, International Application No. PCT/GB2020/050723, dated Jun. 16, 2020.

Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.

Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.

Liu, Yuxi et al., "Biometric identification based on Transient Evoked Otoacoustic Emission", IEEE International Symposium on Signal Processing and Information Technology, IEEE, Dec. 12, 2013, pp. 267-271.

Toth, Arthur R., et al., Synthesizing Speech from Doppler Signals, ICASSP 2010, IEEE, pp. 4638-4641.

Boesen, U.S. Appl. No. 62/403,045, filed Sep. 30, 2017.

Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.

Meng, Y. et al., "Liveness Detection for Voice User Interface via Wireless Signals in IoT Environment," in IEEE Transactions on Dependable and Secure Computing, doi: 10.1109/TDSC.2020.2973620.

First Office Action, China National Intellectual Property Administration, Application No. 2018800720846, dated Mar. 1, 2021.

Wu, Libing, et al., LVID: A Multimodal Biometricas Authentication System on Smartphones, IEEE Transactions on Information Forensics and Security, Vo. 15, 2020, pp. 1572-1585.

Wang, Qian, et al., VoicePop: A Pop Noise based Anti-spoofing System for Voice Authentication on Smartphones, IEEE INFOCOM 2019—IEEE Conference on Computer Communications, Apr. 29-May 2, 2019, pp. 2062-2070.

Examination Report under Section 18(3), UKIPO, Application No. GB1918956.2, dated Jul. 29, 2021.

Examination Report under Section 18(3), UKIPO, Application No. GB1918965.3, dated Aug. 2, 2021.

Combined Search and Examination Report under Sections 17 and 18(3), UKIPO, Application No. GB2114337.5, dated Nov. 3, 2021.

Combined Search and Examination Report under Sections 17 and 18(3), UKIPO, Application No. GB2105613.0, dated Sep. 27, 2021.

Combined Search and Examination Report under Sections 17 and 18(3), UKIPO, Application No. GB2112228.8, dated May 17, 2022.

Search Report under Section 17, UKIPO, Application No. GB2202521.7, dated Jun. 21, 2022.

Combined Search and Examination Report under Sections 17 and 18(3), UKIPO, Application No. GB2210986.2, dated Nov. 15, 2022.

First Office Action, China National Intellectual Property Administration, Patent Application No. 2018800419187, dated Feb. 28, 2023.

Notice of Preliminary Rejection, Korean Intellectual Property Office, Patent Application No. 10-2020-7002065, dated Apr. 17, 2023.

Notice of Preliminary Rejection, Korean Intellectual Property Office, Patent Application No. 10-2020-7002061, dated Apr. 27, 2023.

Wu et al., A study on replay attack and anti-spoofing for text-dependent speaker verification, Signal and Information Processing Association Annual Summit and Conference (APSIPA), 2014 Asia-Pacific, Dec. 9-12, 2014, IEEE.

\* cited by examiner

SPEAKER IDENTIFICATION

This application is a continuation-in-part of U.S. patent application Ser. No. 15/877,660, filed Jan. 23, 2018; United Kingdom Patent Application Serial No. 1809474.8, filed Jun. 8, 2018, and U.S. Provisional Patent Application Ser. No. 62/733,755, filed Sep. 20, 2018, each of which is incorporated by reference herein in its entirety.

TECHNICAL FIELD

Embodiments described herein relate to methods and devices for analysing speech signals.

BACKGROUND

Many devices include microphones, which can be used to detect ambient sounds. In many situations, the ambient sounds include the speech of one or more nearby speaker. Audio signals generated by the microphones can be used in many ways. For example, audio signals representing speech can be used as the input to a speech recognition system, allowing a user to control a device or system using spoken commands.

SUMMARY

According to an aspect of the invention, there is provided a method of speaker identification, comprising:
  receiving an audio signal representing speech;
  performing a first voice biometric process on the audio signal to attempt to identify whether the speech is the speech of an enrolled speaker; and
  if the first voice biometric process makes an initial determination that the speech is the speech of an enrolled user, performing a second voice biometric process on the audio signal to attempt to identify whether the speech is the speech of the enrolled speaker,
  wherein the second voice biometric process is selected to be more discriminative than the first voice biometric process.

In some embodiments, the second voice biometric process is configured to have a lower False Acceptance Rate than the first voice biometric process.

In some embodiments, the second voice biometric process is configured to have a lower False Rejection Rate than the first voice biometric process.

In some embodiments, the second voice biometric process is configured to have a lower Equal Error Rate than the first voice biometric process.

In some embodiments, the first voice biometric process is selected as a relatively low power process compared to the second voice biometric process.

In some embodiments, the method comprises making a decision as to whether the speech is the speech of the enrolled speaker, based on a result of the second voice biometric process.

In some embodiments, the method comprises making a decision as to whether the speech is the speech of the enrolled speaker, based on a fusion of a result of the first voice biometric process and a result of the second voice biometric process.

In some embodiments, the first voice biometric process is selected from the following: a process based on analysing a long-term spectrum of the speech; a method using a Gaussian Mixture Model; a method using Mel Frequency Cepstral Coefficients; a method using Principal Component Analysis; a Joint Factor Analysis process; a Tied Mixture of Factor Analyzers process; a method using machine learning techniques such as Deep Neural Nets (DNNs) or Convolutional Neural Nets (CNNs); and a method using a Support Vector Machine.

In some embodiments, the second voice biometric process is selected from the following: a method using a Gaussian Mixture Model; a neural net process, a Joint Factor Analysis process; a Tied Mixture of Factor Analyzers process; a method using machine learning techniques such as Deep Neural Nets (DNNs) or Convolutional Neural Nets (CNNs); an x-vector process; and an i-vector process.

In some embodiments, the second voice biometric process is a different type of process from the first voice biometric process. That is, the first voice biometric process might be a process selected from the first list above, while the second voice biometric process might be a different process selected from the second list above.

In some other embodiments, the first and second voice biometric processes might be the same type of process, but with the second voice biometric process configured to be more discriminative than the first. For example, the first and second voice biometric processes might both use Gaussian Mixture Models, with the second process using more mixtures. More specifically, the first voice biometric process might be a 16 mixture Gaussian Mixture Model, while the second voice biometric process might be a 4096 mixture Gaussian Mixture Model. As another example, the first and second voice biometric processes might both use Deep Neural Nets, with the second process using more weights. In both of these cases, the second more discriminative process might be trained with more data.

In some embodiments, the first voice biometric process is performed in a first device and the second voice biometric process is performed in a second device remote from the first device. The first device may comprise a wearable device such as a headset device, a smart glasses device, a smart watch device. The second device may comprise a host device such as a mobile phone or tablet computer. In some embodiments, the first device may be provided as part of a CODEC device or chip, or as part of a digital microphone device or chip. In some embodiments, the second device may be provided as part of a central processor such as an applications processor, or as part of a dedicated biometrics processor device or chip. In particular, the first device may be provided as part of a CODEC device or chip, or as part of a digital microphone device or chip, within a product such as a mobile phone, tablet computer, smart speaker or home automation controller, while the second device is provided as part of a central processor such as an applications processor, or as part of a dedicated biometrics processor device or chip, within the same product.

In one aspect of the invention, there is provided a first device configured to perform the first voice biometric process, and in another aspect of the invention there is provided a second device configured to perform the second voice biometric process.

In some embodiments, the method comprises maintaining the second voice biometric process in a low power state, and activating the second voice biometric process if the first voice biometric process makes an initial determination that the speech is the speech of an enrolled user. The second biometric process is power-gated by the first biometric process. This can allow for the first biometric process to operate in a relatively low-power zone of a device, while the second biometric process may be provided in a relatively high-power zone of a device, e.g. within an applications processor or similar.

In some embodiments, the method comprises activating the second voice biometric process in response to an initial determination based on a partial completion of the first voice biometric process that the speech might be the speech of an enrolled user, and deactivating the second voice biometric process in response to a determination based on a completion of the first voice biometric process that the speech is not the speech of the enrolled user.

In some embodiments, the method comprises:
detecting a trigger phrase in the received audio signal; and
responsive to the detecting of a trigger phrase, performing the first voice biometric process on the received audio signal.

In some embodiments, the method comprises:
detecting voice activity in the received audio signal; and
responsive to the detecting of voice activity, performing the first voice biometric process on at least a part of the received audio signal.

In some embodiments, the method comprises:
detecting voice activity in the received audio signal;
responsive to the detecting of voice activity, performing keyword detection; and
responsive to detecting a keyword, performing the first voice biometric process on at least a part of the received audio signal.

In some embodiments, the method comprises:
performing the first voice biometric process on the entire received audio signal.

In some embodiments, the method comprises using an initial determination by the first voice biometric process, that the speech is the speech of an enrolled user, as an indication that the received audio signal comprises speech.

In some embodiments, the method comprises:
performing at least a part of a voice biometric process suitable for determining whether a signal contains speech of an enrolled user, and generating an output signal when it is determined that the signal contains human speech.

In some embodiments, the method comprises comparing a similarity score with a first threshold to determine whether the signal contains speech of an enrolled user, and comparing the similarity score with a second, lower, threshold to determine whether the signal contains speech.

In some embodiments, the method comprises determining that the signal contains human speech before it is possible to determine whether the signal contains speech of an enrolled user.

In some embodiments, the first voice biometric process is configured as an analog processing system, and the second voice biometric process is configured as a digital processing system.

According to one aspect, there is provided a speaker identification system, comprising:
an input for receiving an audio signal representing speech;
a first processor for performing a first voice biometric process on the audio signal to attempt to identify whether the speech is the speech of an enrolled speaker; and
a second processor for performing a second voice biometric process on the audio signal to attempt to identify whether the speech is the speech of the enrolled speaker,
wherein the second voice biometric process is initiated if the first voice biometric process makes an initial determination that the speech is the speech of an enrolled user, and
wherein the second voice biometric process is selected to be more discriminative than the first voice biometric process.

In some embodiments, the speaker identification system further comprises:
a buffer, for storing the received audio signal, and for supplying the stored received audio signal to the second voice biometric process if the first voice biometric process makes an initial determination that the speech is the speech of an enrolled user.

In some embodiments, the second voice biometric process is configured to have a lower False Acceptance Rate than the first voice biometric process.

In some embodiments, the second voice biometric process is configured to have a lower False Rejection Rate than the first voice biometric process.

In some embodiments, the second voice biometric process is configured to have a lower Equal Error Rate than the first voice biometric process.

In some embodiments, the first voice biometric process is selected as a relatively low power process compared to the second voice biometric process.

In some embodiments, the speaker identification system is configured for making a decision as to whether the speech is the speech of the enrolled speaker, based on a result of the second voice biometric process.

In some embodiments, the speaker identification system is configured for making a decision as to whether the speech is the speech of the enrolled speaker, based on a fusion of a result of the first voice biometric process and a result of the second voice biometric process.

In some embodiments, the first voice biometric process is selected from the following: a process based on analysing a long-term spectrum of the speech; a method using a Gaussian Mixture Model; a method using Mel Frequency Cepstral Coefficients; a method using Principal Component Analysis; a Joint Factor Analysis process; a Tied Mixture of Factor Analyzers process; a method using machine learning techniques such as Deep Neural Nets (DNNs) or Convolutional Neural Nets (CNNs); and a method using a Support Vector Machine.

In some embodiments, the second voice biometric process is selected from the following: a neural net process, a Joint Factor Analysis process; a Tied Mixture of Factor Analyzers process; a method using machine learning techniques such as Deep Neural Nets (DNNs) or Convolutional Neural Nets (CNNs); and an i-vector process or an x-vector process.

In some embodiments, the speaker identification system comprises:
a first device; and
a second device,
wherein the first device includes the first processor, and the second device includes the second processor.

In some embodiments, the first device comprises a first integrated circuit, and the second device comprises a second integrated circuit.

In some embodiments, the first device comprises a dedicated biometrics integrated circuit.

In some embodiments, the first device is an accessory device.

In some embodiments, the first device is a listening device.

In some embodiments, the second device comprises an applications processor.

In some embodiments, the second device is a handset device.

In some embodiments, the second device is a smartphone.

In some embodiments, the speaker identification system comprises:
- a trigger phrase detector for attempting to detect a trigger phrase in the received audio signal,
- wherein the first processor is responsive to the trigger phrase detector, and configured to perform the first voice biometric process on the received audio signal in response to detecting of a trigger phrase.

In some embodiments, the speaker identification system comprises:
- a voice activity detector for attempting to detect human speech in the received audio signal,
- wherein the first processor is responsive to the trigger phrase detector, and configured to perform the first voice biometric process on the received audio signal responsive to detecting of voice activity.

In some embodiments, the first processor is configured to receive the entire received audio signal for performing the first voice biometric process thereon.

In some embodiments, the first voice biometric process is configured as an analog processing system, and the second voice biometric process is configured as a digital processing system.

In one aspect of the invention, there is provided a first device as defined above, comprising said first processor.

In another aspect of the invention there is provided a second device as defined above, comprising said second processor.

According to another aspect of the present invention, there is provided a device comprising at least a part of such a system. The device may comprise a mobile telephone, an audio player, a video player, a mobile computing platform, a games device, a remote controller device, a toy, a machine, or a home automation controller or a domestic appliance.

According to an aspect, there is provided a processor integrated circuit for use in a speaker identification system, the processor integrated circuit comprising:
- an input for receiving an audio signal representing speech;
- a first processor for performing a first voice biometric process on the audio signal to attempt to identify whether the speech is the speech of an enrolled speaker; and
- an output, for providing the audio signal to a separate device if the first voice biometric process makes an initial determination that the speech is the speech of an enrolled user.

In some embodiments, the processor integrated circuit further comprises:
- a buffer, for storing the received audio signal, and for supplying the stored received audio signal to the output if the first voice biometric process makes an initial determination that the speech is the speech of an enrolled user.

In some embodiments, the first voice biometric process is selected from the following: a process based on analysing a long-term spectrum of the speech; a method using a Gaussian Mixture Model; a method using Mel Frequency Cepstral Coefficients; a method using Principal Component Analysis; a method using machine learning techniques such as Deep Neural Nets (DNNs); and a method using a Support Vector Machine.

In some embodiments, the first voice biometric process is configured as an analog processing system.

In some embodiments, the processor integrated circuit further comprises an anti-spoofing block, for performing one or more tests on the received signal to determine whether the received signal has properties that may indicate that it results from a replay attack.

Preferably, the first processor, or the device performing the first voice biometric process on the audio signal, is configured to perform a spoof detection process on the audio signal, to identify if the audio signal is the result of a replay attack,
- wherein the output of the first voice biometric process is gated by the output of the spoof detection process, such that if a spoof attack is detected, the first voice biometric process is prevented from initiating the second voice biometric process.

In a preferred aspect, the spoof detection process comprises a relatively low-power spoof detection process. In one example, the spoof detection process involves analysing the received audio signal to detect low-frequency power levels (for example the power levels at frequencies below 100 Hz). If the low-frequency power levels are below a threshold level, this may indicate that the received audio signal is a result of detecting sound resulting from playing a signal through a loudspeaker rather than speech generated by a live person. The received audio signal may then be flagged as a spoof.

According to an aspect, there is provided a processor integrated circuit for use in a speaker identification system, the processor integrated circuit comprising:
- an input for receiving an audio signal representing speech;
- a second processor for performing a second voice biometric process on the audio signal to attempt to identify whether the speech is the speech of the enrolled speaker, wherein the second voice biometric process is initiated if a first voice biometric process performed on a separate device makes an initial determination that the speech is the speech of an enrolled user, and
- wherein the second voice biometric process is selected to be more discriminative than the first voice biometric process.

In some embodiments, the processor integrated circuit comprises a decision block, for making a decision as to whether the speech is the speech of the enrolled speaker, based on a result of the second voice biometric process.

In some embodiments, the processor integrated circuit comprises a decision block, for making a decision as to whether the speech is the speech of the enrolled speaker, based on a fusion of a result of the first voice biometric process performed on the separate device and a result of the second voice biometric process.

In some embodiments, the second voice biometric process is selected from the following: a neural net process, a Joint Factor Analysis process; a Tied Mixture of Factor Analyzers process; and an i-vector process.

In some embodiments, the second device comprises an applications processor.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

According to another aspect of the present invention, there is provided a method of voice activity detection, the method comprising performing at least a part of a voice biometric process suitable for determining whether a signal contains speech of an enrolled user, and generating an output signal when it is determined that the signal contains human speech.

The method may comprise comparing a similarity score with a first threshold to determine whether the signal contains speech of an enrolled user, and comparing the similarity score with a second, lower, threshold to determine whether the signal contains speech.

The method may comprise determining that the signal contains human speech before it is possible to determine whether the signal contains speech of an enrolled user.

According to an aspect of the invention, there is provided a speaker verification method to provide a speaker verification output comprising the steps of:
  receiving audio comprising speech;
  performing a speaker verification process on the received audio, the speaker verification process configured to output:
    (i) a speaker ID score representing the likelihood that the received speech is from a particular speaker, and
    (ii) a sound classification representing the likelihood that the received speech is a particular acoustic class;
  performing an audio validation process on the received audio to generate an output that the received audio is valid or invalid, wherein the audio validation process is based at least in part on the sound classification from the speaker verification process; and
  gating the output of the speaker verification process based on the output of the audio validation process, to ensure that the method only provides a speaker verification output for valid received audio.

Gating the speaker verification output by using an audio validity check to confirm that the received audio is valid ensures that the speaker verification result is only used for audio which is not from a replay attack or a spoof attack, and additionally or alternatively, ensures that the received audio used in the speaker verification is from the same speaker, and is not from a combative or tail-gating attack. By using the sound classification output from the speaker verification process in the audio validation process, accordingly the resources required for such an audio validation process can be minimised, and associated latency reduced.

It will be understood that if the speaker ID score satisfies a predefined condition, e.g. a speaker probability score or log likelihood ratio exceeds a predefined probability threshold, or a speaker distance score is beneath a predefined distance threshold, accordingly the speaker verification method may output an indication that the received audio is spoken by an identified speaker.

In one aspect, the speaker verification output comprises an indication that the received audio is spoken by an identified speaker, based on the speaker ID score output by the speaker verification process. It will be understood that if the speaker ID score satisfies a predefined condition, e.g. a speaker probability score exceeds a predefined probability threshold or log likelihood ratio, or a speaker distance score is beneath a predefined distance threshold, accordingly the method may generate the speaker verification output based on the satisfied condition.

In an additional or alternative aspect, the speaker ID score output by the speaker verification process may be provided as the speaker verification output for the method. It will be further understood that such an indication of an identified speaker may be output in combination with the speaker ID score.

The sound classification will be understood as an indication of the acoustic classes present in received audio, for example sound mixtures, phonemes, phones, senones, etc.

In a preferred aspect, the audio validation process is additionally based at least in part on the speaker ID score from the speaker verification process.

Preferably, the step of performing an audio validation process comprises:
  performing an anti-spoofing (AS) process based on the received audio and the sound classification.

The anti-spoofing process comprises determining the probability of a replay attack or a presentation attack on the speaker verification method.

An example of an anti-spoofing process using received audio and an indication of the acoustic classes present in speech can be found in co-pending U.S. patent application Ser. No. 16/050,593, the contents of which are incorporated by reference herein.

Additionally, the anti-spoofing process may comprise:
  an ultrasonic-power-level-based anti-spoofing system, such as those described in co-pending U.S. patent application Ser. Nos. 62/571,944, 62/572,016, 15/980,491, the contents of which are incorporated by reference herein;
  a magnetic-power-level-based anti-spoofing system, such as those described in co-pending U.S. patent application Ser. Nos. 16/020,406, 16/018,795, the contents of which are incorporated by reference herein;
  a loudspeaker-detection-based anti-spoofing system, such as those described in co-pending U.S. patent application Ser. Nos. 62/571,959, 62/585,721, 62/585,660, 62/571,978, 16/017,072, the contents of which are incorporated by reference herein.

In embodiments wherein multiple different anti-spoofing processes are performed, it will be understood that the outputs of such different anti-spoofing processes may be combined or fused to provide an anti-spoofing decision. In the case of combining or fusing the outputs, the output values of the different processes may be provided with different weights to account for such factors as the usage situations or environment, device characteristics, etc.

Preferably, the step of performing an audio validation process comprises:
  performing a speaker change detection (SCD) process based on a combination of at least one or more of the following: the speaker ID score; the sound classification; the received audio.

Preferably, the SCD process is based on a time-windowed speaker ID score, such as that described in co-pending U.S. patent application Ser. No. 16/122,033, the contents of which are incorporated by reference herein. The SCD process may be performed on statistics derived from a frame-by-frame scoring of the received audio.

Additionally or alternatively, the SCD process may comprise:
  monitoring for a change in the fundamental frequency, or F0, of the received audio;
  monitoring for a change in the distribution of the acoustic classes of the received audio identified from the sound classification;

monitoring for a change in the fundamental frequency of the received audio for a particular acoustic class identified from the sound classification;

accent tracking;

emotion tracking;

any other suitable speaker change detection method, such as that described in (Ajmera, Jitendra & Mccowan, Iain & Bourlard, Nerve. (2004). Robust Speaker Change Detection. Signal Processing Letters, IEEE. 11. 649-651. 10.1109/LSP.2004.831666).

The SCD process defines accurate boundaries for the processing of the received audio, and prevents exploitation of the speaker verification method by combative or tailgating attacks.

In embodiments wherein multiple different SCD processes are performed, it will be understood that the outputs of such different SCD processes may be combined or fused to provide an SCD decision. In the case of combining or fusing the outputs, the output values of the different processes may be provided with different weights to account for such factors as the usage situations or environment, device characteristics, etc.

In some embodiments, the output of the SCD process may be used as an input to the speaker verification process, wherein the output of the SCD process defines that portion of the received audio on which a speaker verification process should be performed. For example, if the SCD process analyses speaker scores on a frame-by-frame basis to determine the point of speaker change, then the SCD output may define the total range of frames to process to determine the final speaker ID score, as it has been determined that all of those frames are spoken by the same speaker.

Preferably, the method further comprises the steps of:

buffering the received audio; and responsive to the step of gating the output of the speaker verification process, outputting the valid speaker recognition output and the buffered audio.

By outputting the received audio along with the valid speaker recognition output, accordingly the further processing of the received audio may be performed, with an initial determination that the received audio is that of a particular speaker. Such additional processing may comprise speech recognition of the received audio for use in command processing, or the received audio may be processed using a more discriminative speaker recognition process, for example for relatively high security operations.

Preferably, the step of performing a speaker recognition process comprises:

performing a plurality of different speaker recognition processes to provide a respective plurality of speaker recognition scores, and fusing the plurality of speaker recognition scores to provide the speaker ID score.

By performing a number of different speaker recognition processes and fusing the results, accordingly a more accurate overall speaker ID score can be provided. Preferably, the different speaker recognition processes are selected to have low correlation between the approaches, so that the fusion of the respective speaker recognition scores provides an improved or more accurate speaker ID score, due to the low cross-correlation between the processes used.

Preferably, the speaker recognition processes comprises one or more of the following:

a Gaussian Mixture Model (GMM) based approach;

a Joint Factor Analysis (JFA) based approach;

a speaker recognition process based on tracking of the fundamental frequency of a speaker, for example as described in co-pending U.S. patent application No. 62/728,421, the contents of which are incorporated by reference herein;

a machine learning or deep neural net based process (ML-DNN).

Preferably, the step of performing a speaker recognition process comprises the steps of:

performing a classification of the received audio to identify a sound classification, the sound classification identifying acoustic classes present in the received audio; and based on the identified sound classification, scoring the received audio against a stored template of the acoustic classes produced by enrolled speakers to identify a speaker for the received audio from the enrolled speakers.

The scoring may comprise a distance calculation, probability metrics, a log likelihood ratio, or any suitable scoring technique for use in speaker recognition, for example as described in "Fundamentals of Speaker Recognition," Homayoon Beigi. ISBN: 978-0-387-77592-0.

Preferably, the method comprises the step of:

performing a feature extraction on the received audio, and wherein said step of performing a speaker recognition process is performed on the feature extract version of the received audio.

Preferably, the step of performing a speaker recognition process is performed responsive to receipt of a trigger signal, for example a keyword detection.

Preferably, the method comprises the step of monitoring for a trigger signal, for example performing a voice keyword detection process.

Alternatively, the step of performing a speaker recognition process is performed continuously for all received audio.

In such an embodiment, preferably, the method comprises the step of generating an output from the speaker verification process responsive to a trigger detection, such as a keyword detect.

Alternatively, in such an embodiment, the step of gating the output of the speaker verification process is based on or responsive to a trigger detection, such as a keyword detect.

There is further provided a speaker recognition method comprising the steps of:

performing at least a portion of the above-described method steps as part of a primary biometrics scoring; and performing a secondary biometrics scoring based on the received audio to provide a second speaker ID score, the secondary biometrics scoring performed responsive to the step of gating of a speaker verification output for valid received audio from the primary biometrics scoring, wherein the secondary biometrics scoring is selected to be different to the primary biometrics scoring.

The use of such a two-stage biometrics scoring system allows for the primary biometrics scoring to be a relatively low-power and/or always-on solution, while the secondary biometrics scoring may be a relatively high-power and/or occasionally triggered solution, or a solution power-gated by the primary biometrics scoring. The second speaker ID score may be output as a simple flag to identify the notionally verified speaker, or the second speaker ID score may be output as a probability value or a distance metric as appropriate. Further details on an appropriate method incorporating such primary and secondary biometrics scoring may be found in co-pending U.S. patent application Ser. No. 15/877, 660, the contents of which are incorporated by reference herein. The primary biometrics scoring may be performed as part of a relatively low power system, e.g. an always-on system.

Preferably, the method comprises the step of fusing the speaker ID score from the primary biometrics scoring with the second speaker ID score of the secondary biometrics scoring to provide a speaker authentication result.

Preferably, the speaker recognition method is configured such that:
  the primary biometrics scoring is selected to have a relatively high False Acceptance Rate (FAR), and a relatively low False Rejection Rate (FRR).

Preferably, the secondary biometrics scoring is selected to have a relatively low FAR.

By selecting the particular biometrics techniques to provide such performance, and/or by tuning the primary and secondary biometrics scoring systems to this effect, accordingly the eventual fusion of the primary and secondary scores results in a robust speaker recognition approach having combined low FAR and FRR scores.

There is further provided a system for implementing steps of above method.

Preferably, there is provided a speaker verification system to provide a speaker verification output, the system comprising:
  an input for receiving an audio signal comprising speech;
  a speaker verification module coupled with the input, the speaker verification module arranged to process the audio signal to provide:
    (i) a speaker ID score representing the likelihood that the received speech is from a particular speaker, and
    (ii) a sound classification representing the likelihood that the received speech is a particular acoustic class;
  an audio validation module coupled with the input and the speaker verification module, the audio validation module arranged to generate an output that the received audio is valid or invalid, the output based at least in part on the sound classification provided by the speaker verification module; and
  a gating module configured to gate the output of the speaker verification module based on the output of the audio validation module, such that the speaker verification system only provides a speaker verification output for valid received audio.

In a further aspect, there is provided a multi-stage speaker verification system, the system comprising:
  an input to receive an audio signal comprising speech;
  a first device including a first processor, the first device comprising the above-described speaker verification system, the first device arranged to provide a first speaker verification output based on the received audio signal; and
  a second device including a second processor, the second device coupled with the first device, the second device configured to perform a secondary biometrics scoring based on the received audio signal to provide a second speaker verification output, the secondary biometrics scoring performed responsive to the receipt of a first speaker verification output from the first device,
  wherein the secondary biometrics scoring is selected to be more discriminative than, different to, or more accurate than the primary biometrics scoring.

Preferably, the system further comprises a fusion module, wherein the fusion module is arranged to fuse the first speaker verification output and the second speaker verification output to provide a fused speaker verification output.

Preferably, the first device is provided as a first integrated circuit, and the second device is provided as a second integrated circuit. In some embodiments, the first device may be provided as part of a CODEC device or chip, or as part of a digital microphone device or chip. By providing the first device in a CODEC or as part of a digital microphone, accordingly the first biometrics process can be performed on the audio as it is received by the system, and can reduce the risk of distortion of audio due to conversion losses, bandwidth restrictions, etc., and/or reduce the risk of malicious attacks on the audio stream by reducing the possible attack vectors between the point where the audio is received and where the first biometric process is performed. In some embodiments, the second device may be provided as part of a central processor such as an applications processor, or as part of a dedicated biometrics processor device or chip.

Preferably the first device is provided as a relatively low-power, always-on device, and the second device is provided as a relatively high-power, occasionally triggered device, preferably power-gated by the first device.

Preferably, the first and second devices are communicatively coupled. Preferably, the first and second devices are provided as elements of the same system, e.g. components of a mobile phone or tablet computer.

The first device may be communicatively coupled with second device, at least in part via a wireless connection. For example, the first device may be provided in a headset system wirelessly coupled with the second device provided in a host system such as a mobile phone.

In one aspect of the invention, there is provided the first device of the multi-stage speaker verification system, wherein the first device is provided with an output for wired or wireless connection to the second device.

In another aspect of the invention, there is provided the second device of the multi-stage speaker verification system, wherein the second device is provided with an input for wired or wireless connection to the first device.

In a further aspect, the first voice biometric process may be replaced by any other suitable biometric process, for example an ear biometric process. It will be understood that the above details may equally apply to embodiments wherein the first voice biometric process is replaced by any other suitable biometric process.

Preferably, there is provided a method of user identification, comprising:
  receiving a first acoustic signal representing an acoustic response received proximate a user's ear;
  performing an ear biometric process on the first acoustic signal to attempt to identify whether the acoustic response is indicative of the ear of an enrolled user;
  receiving a second audio signal representing speech; and
  if the ear biometric process makes an initial determination that the audio response is indicative of the ear of an enrolled user, performing a voice biometric process on the second audio signal to attempt to identify whether the speech is the speech of the enrolled user.

The ear biometric process may be used to power gate the voice biometric process. The ear biometric process will be different to the voice biometric process, thereby providing individual discriminative results. Preferably the outputs of the ear biometric process and the voice biometric process can be combined or fused to provide an output to identify a user. In such an embodiment, it will be understood that the ear biometric process may be performed in a device such as a headset or earphone, with the voice biometric process performed in the same device, or in a coupled host device, e.g. a mobile phone handset. Alternatively, the ear biometric process and the voice biometric process may be performed in the same host device, e.g. a mobile phone handset. It will be understood that the first acoustic signal may comprise an ultrasonic audio signal (for example in the region from 18 kHz-48 kHz) and/or an audible audio signal. An example of a system having both ear and voice biometric processes, and additionally where the outputs of such processes are fused, may be found in co-pending U.S. patent application Ser. No. 16/118,950, the contents of which are incorporated by reference herein.

Preferably, the voice biometric process is selected to be more discriminative than the ear biometric process. By more discriminative, this may include that the voice biometric process is more accurate, or requires more processing resources to provide a more accurate result.

There is further provided a system for user identification comprising:
- a first device including a first processor, the first device configured to receive a first acoustic signal representing an acoustic response received proximate a user's ear, and further configured to perform an ear biometric process on the first acoustic signal to attempt to identify whether the acoustic response is indicative of the ear of an enrolled user to provide a first user verification output; and
- a second device including a second processor, the second device coupled with the first device, the second device configured to receive a second audio signal representing speech, and further configured to perform a voice biometrics process based on the second audio signal to provide a second user verification output, the voice biometrics scoring performed responsive to the receipt of a first user verification output from the first device, wherein the voice biometrics scoring is selected to be different to the ear biometrics scoring.

Preferably, in any of the above-described methods, the method further comprises the steps of:
- continuing to perform the first voice biometric process on the audio signal after the initial determination, to provide a further determination whether the speech is the speech of an enrolled user; and
- wherein the output of the second voice biometric process is gated by the further determination of the first voice biometric process.

By continuing to perform the first biometric process after the initial identification of a speaker, accordingly the second biometric process can be speculatively initiated before the first biometric process makes a further or final determination as to whether the speech is the speech of an enrolled user. By speculatively initiating the second process, accordingly there is a corresponding reduction in the overall system latency. By gating the output of the secondary process based on the further or final determination of the primary process, accordingly the accuracy of the entire system is preserved.

Preferably, in any of the above-described systems, the system is arranged such that:
- the first device including the first processor is configured to continue to perform the first voice biometric process on the audio signal after the initial determination, to provide a further determination whether the speech is the speech of an enrolled user; and
- wherein second device including the second processor is configured such that the output of the second voice biometric process is gated by the further determination of the first voice biometric process.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein may be implemented in a wide range of devices and systems. However, for ease of explanation of one embodiment, an illustrative example will be described, in which the implementation occurs in a smartphone.

Figure 1:
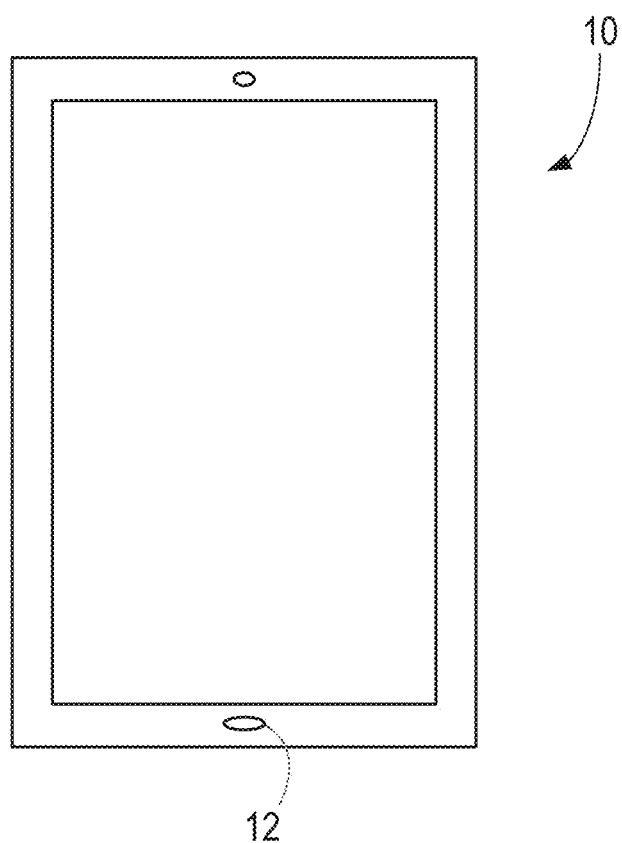
FIG. 1 illustrates an example smartphone.

FIG. 1 illustrates one example of a device in which the system may be embodied, namely a smartphone 10, having a microphone 12 for detecting ambient sounds. In normal use, the microphone is of course used for detecting the speech of a user who is holding the smartphone 10 close to their face.

Figure 2:
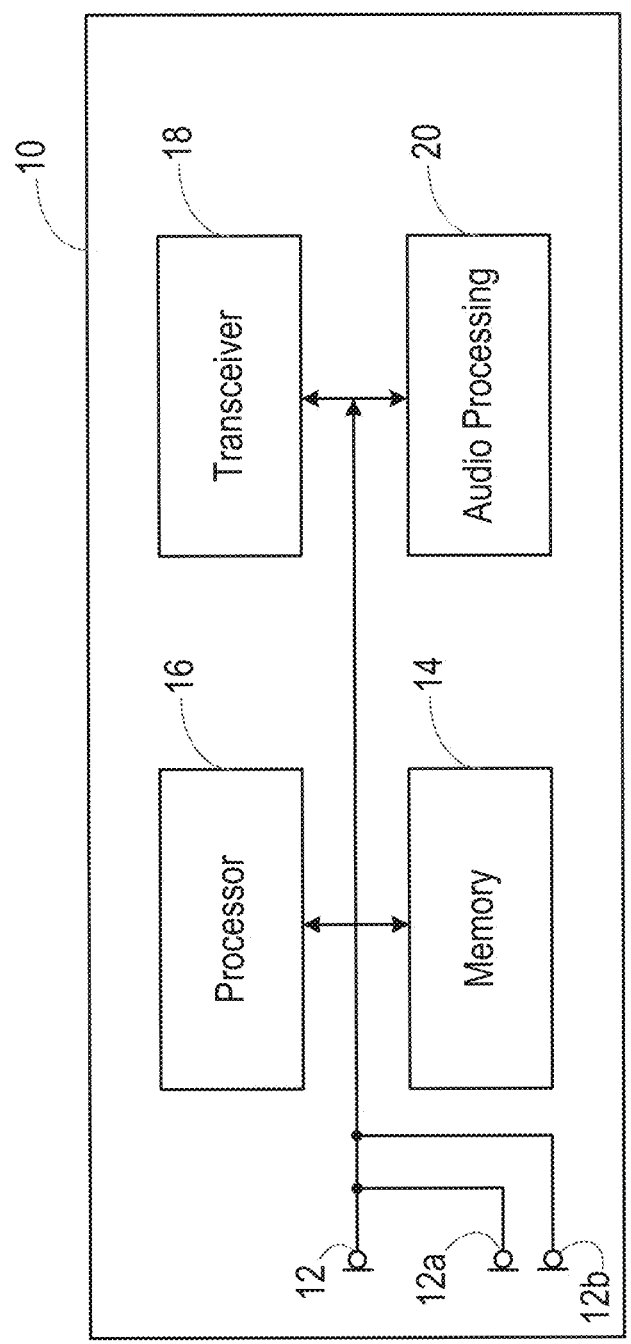
FIG. 2 is an example schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of embodiments of the present disclosure.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the present disclosure relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In other embodiments, a first part of the voice biometric functionality is performed on the smartphone 10 or other device that is located close to the user. Then, as described in more detail below, a signal may be transmitted using the transceiver 18 to a remote system, which performs a second part of the voice biometric functionality.

For example, the speech recognition system may be located on one or more remote server in a cloud computing environment. Signals based on the meaning of the spoken commands are then returned to the smartphone 10 or other local device.

Methods described herein proceed from the recognition that different parts of a user's speech have different properties.

Specifically, it is known that speech can be divided into voiced sounds and unvoiced or voiceless sounds. A voiced sound is one in which the vocal cords of the speaker vibrate, and a voiceless sound is one in which they do not.

It is now recognised that the voiced and unvoiced sounds have different frequency properties, and that these different frequency properties can be used to obtain useful information about the speech signal.

Figure 3:
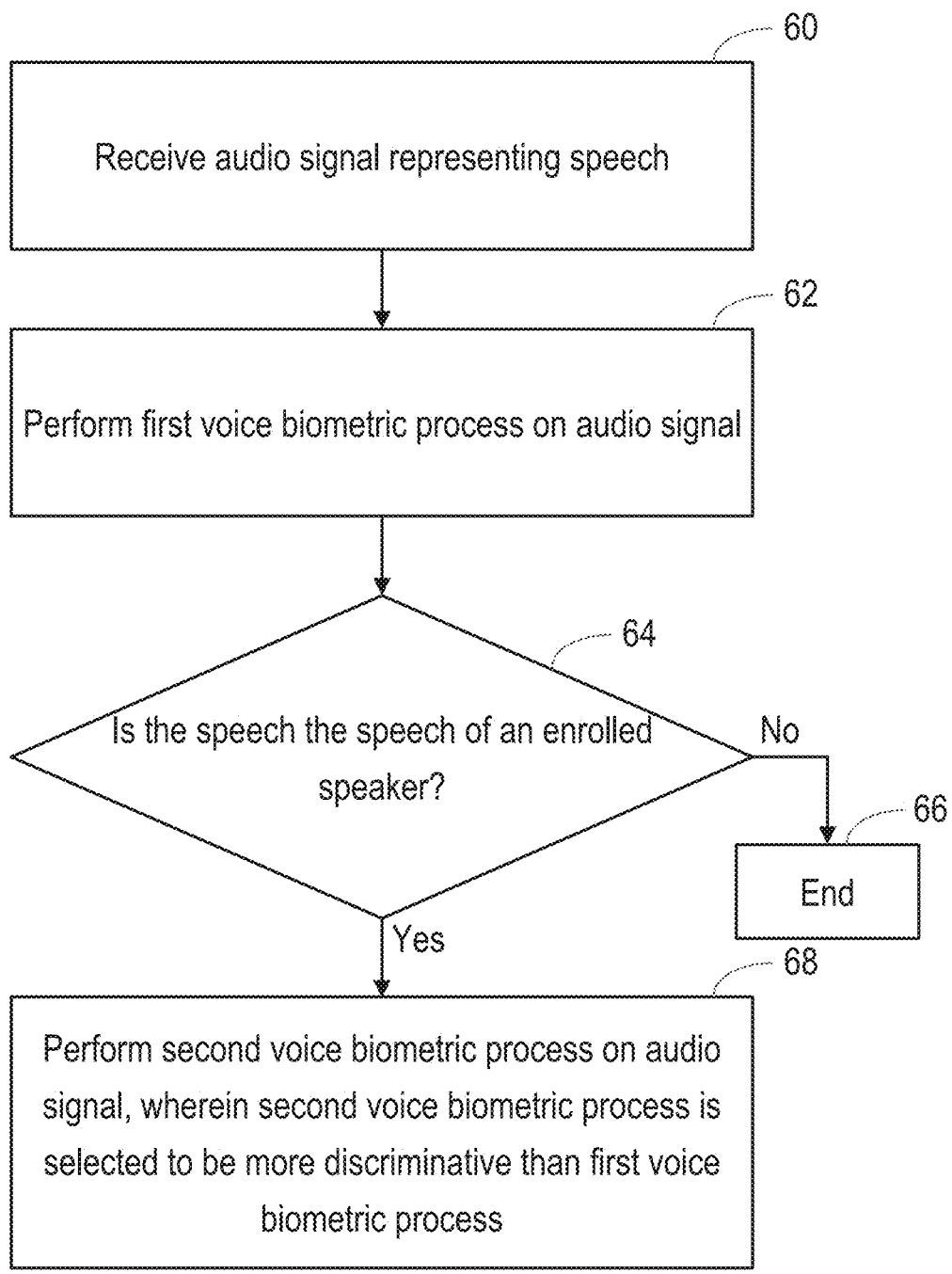
FIG. 3 is an example flow chart illustrating a method of analysing an audio signal.
Figure 4:
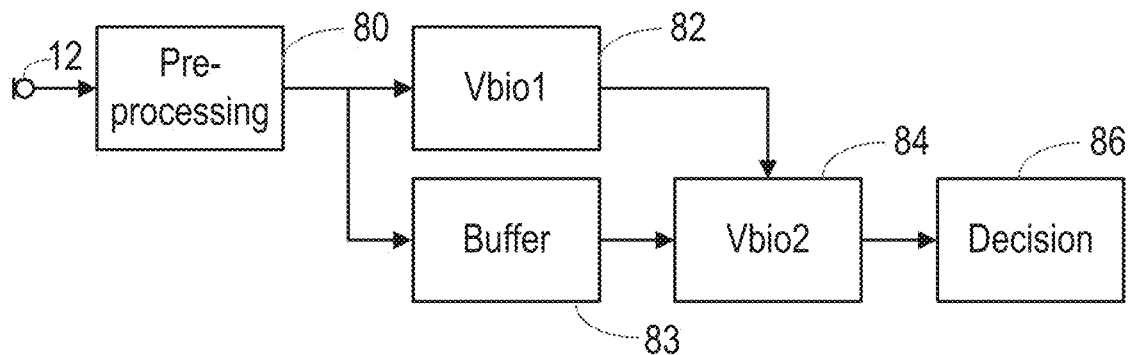
FIG. 4 is an example block diagram illustrating a system for analysing an audio signal.
Figure 5:
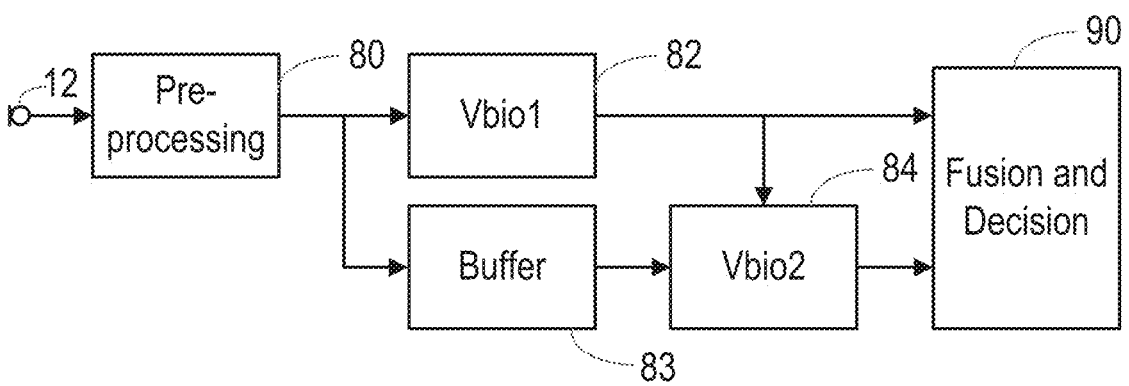
FIG. 5 is an example block diagram illustrating an alternative system for analysing an audio signal.

FIG. 3 is a flow chart, illustrating a method of analysing an audio signal, and FIGS. 4 and 5 are block diagrams illustrating functional blocks in the analysis system.

Specifically, in step 60 in the method of FIG. 3, an audio signal, which is expected to contain speech, is generated by a microphone 12 of the system shown in FIGS. 4 and 5, in response to the detected sound. It will be understood that the microphone 12 may be provided by any suitable audio transceiver capable of providing an audio signal in response to detected sound. For example, this may comprise a loudspeaker configured to operate as a microphone, a surface audio transceiver configured to receive sound, etc.

The audio signal may for example be expected to contain the speech of a specific speaker, who has previously enrolled in the speaker recognition system. In that case, the aim of the method may be to determine whether the person speaking is indeed the enrolled speaker, in order to determine whether any commands that are spoken by that person should be acted upon.

The signal generated by the microphone 12 is passed to a pre-processing block 80. Typically, the signal received from the microphone 12 is an analog signal, and the pre-processing block 80 includes an analog-digital converter, for converting the signal into a digital form. Also in the pre-processing block 80, the received signal may be divided into frames, which may for example have lengths in the range of 10-100 ms, and then passed to a voice activity detection block. Frames that are considered to contain speech are then output from the pre-processing block 80. In other embodiments, different acoustic classes of speech are considered. In that case, for example, frames that are considered to contain voiced speech are output from the pre-processing block 80.

In some cases, the speech processing system is a trigger-dependent system. In such cases, it is determined whether the detected speech contains a predetermined trigger phrase (such as "Hello phone", or the like) that the user must speak in order to wake the system out of a low-power mode. The frames that are considered to contain voiced speech are then output from the pre-processing block 80 only when that trigger phrase has been detected. Thus, in this case, there is a voice activity detection step; if voice activity is detected, a voice keyword detection (trigger phrase detection) process is initiated; and the audio signal is output from the pre-processing block 80 only if voice activity is detected and if the keyword (trigger phrase) is detected.

In other cases, the speech processing system does not rely on the use of a trigger phrase. In such cases, all frames that are considered to contain voiced speech are output from the pre-processing block 80.

The signal output from the pre-processing block 80 is passed to a first voice biometric block (Vbio1) 82 and, in step 62 of the process shown in FIG. 3, a first voice biometric process is performed on the audio signal. As is conventional for a voice biometric process, this attempts to identify, in step 64 of the process shown in FIG. 3, whether the speech is the speech of an enrolled speaker.

If the first voice biometric process performed in the first voice biometric block 82 determines that the speech is not the speech of the enrolled speaker, the process passes to step 66, and ends. Any speech thereafter may be disregarded, until such time as there is evidence that a different person has started speaking.

The signal output from the pre-processing block 80 is also passed to a buffer 83, the output of which is connected to a second voice biometric block (Vbio2) 84. If, in step 64 of the process shown in FIG. 3, the first voice biometric process has made a provisional or initial determination that the speech might be the speech of the enrolled speaker, the second voice biometric block 84 is activated.

Then, in step 68 of the process shown in FIG. 3, a second voice biometric process is performed on the audio signal that was stored in the buffer 83. Again, this second biometric process attempts to identify whether the speech is the speech of an enrolled speaker.

The second voice biometric process performed in step 68 is selected to be more discriminative than the first voice biometric process performed in step 62.

For example, the term "more discriminative" may mean that the second voice biometric process is configured to have a lower False Acceptance Rate (FAR), a lower False Rejection Rate (FRR), or a lower Equal Error Rate (EER) than the first voice biometric process.

In some embodiments, the first voice biometric process performed in the first voice biometric block 82 is configured to have a relatively high False Acceptance Rate (FAR), and a relatively low False Rejection Rate (FRR), while the second voice biometric process performed in the second voice biometric block 84 is configured to have a relatively low FAR. For example, the first voice biometric process performed in the first voice biometric block 82 may be configured to have a FAR of greater than 5%, for example 8-12%, and specifically 10%; and may be configured to have a FRR of less than 3%, for example 0.5-2%, and specifically 1%. For example, the second voice biometric process performed in the second voice biometric block 84 may be configured to have a FAR of less than 0.1%, for example 0.005-0.05%, and specifically 0.01% (1/10000); and may be configured to have a FRR of greater than 3%, for example 3-8%, and specifically 5%.

Thus, the first voice biometric process may be selected as a relatively low power, and/or less computationally expensive, process, compared to the second voice biometric process. This means that the first voice biometric process may be running on all detected speech, while the higher power and/or more computationally expensive second voice biometric process may be maintained in a low power or inactive state, and activated only when the first process already suggests that there is a high probability that the speech is the speech of the enrolled speaker. In some other embodiments, where the first voice biometric process is a suitably low power process, it may be used without using a voice activity detection block in the pre-processing block 80. In those embodiments, all frames (or all frames that are considered to contain a noticeable signal level) are output from the pre-processing block 80. This is applicable when the first voice biometric process is such that it is considered more preferable to run the first voice biometric process on the entire audio signal than to run a dedicated voice activity detector on the entire audio signal and then run the first voice biometric process on the frames of the audio signal that contain speech.

In some embodiments, the second voice biometric block 84 is activated when the first voice biometric process has completed, and has made a provisional or initial determination based on the whole of a speech segment that the speech might be the speech of the enrolled speaker.

In other embodiments, in order to reduce the latency of the system, the second voice biometric block 84 is activated before the first voice biometric process has completed. In those embodiments, the provisional or initial determination may be based on an initial part of a speech segment or alternatively may be based on a partial calculation relating to the whole of a speech segment. Further, in such cases, the second voice biometric block 84 is deactivated if the final determination by the first voice biometric process is that there is a relatively low probability the speech is the speech of the enrolled speaker.

For example, the first voice biometric process may be a voice biometric process selected from a group comprising: a process based on analysing a long-term spectrum of the speech, as described in UK Patent Application No. 1719734.4; a method using a simple Gaussian Mixture Model (GMM); a method using Mel Frequency Cepstral Coefficients (MFCC); a method using Principle Component Analysis (PCA); a Joint Factor Analysis process; a Tied Mixture of Factor Analyzers process; a method using machine learning techniques such as Deep Neural Nets (DNNs) or Convolutional Neural Nets (CNNs); and a method using a Support Vector Machine (SVM), amongst others.

For example, the second voice biometric process may be a voice biometric process selected from a group comprising: a neural net (NN) process; a Joint Factor Analysis (JFA) process; a Tied Mixture of Factor Analyzers (TMFA); a method using machine learning techniques such as Deep Neural Nets (DNNs) or Convolutional Neural Nets (CNNs); and an i-vector process or an x-vector process, amongst others.

In some other embodiments, the first and second voice biometric processes might be the same type of process, but with the second voice biometric process configured to be more discriminative than the first. For example, the first and second voice biometric processes might both use Gaussian Mixture Models, with the second process using more mixtures. More specifically, the first voice biometric process might be a 16 mixture Gaussian Mixture Model, while the second voice biometric process might be a 4096 mixture Gaussian Mixture Model. As another example, the first and second voice biometric processes might both use Deep Neural Nets, with the second process using more weights. In both of these cases, the second more discriminative process might be trained with more data.

In some examples, the first voice biometric process may be configured as an analog processing biometric system, with the second voice biometric process configured as a digital processing biometric system.

Figure 6:
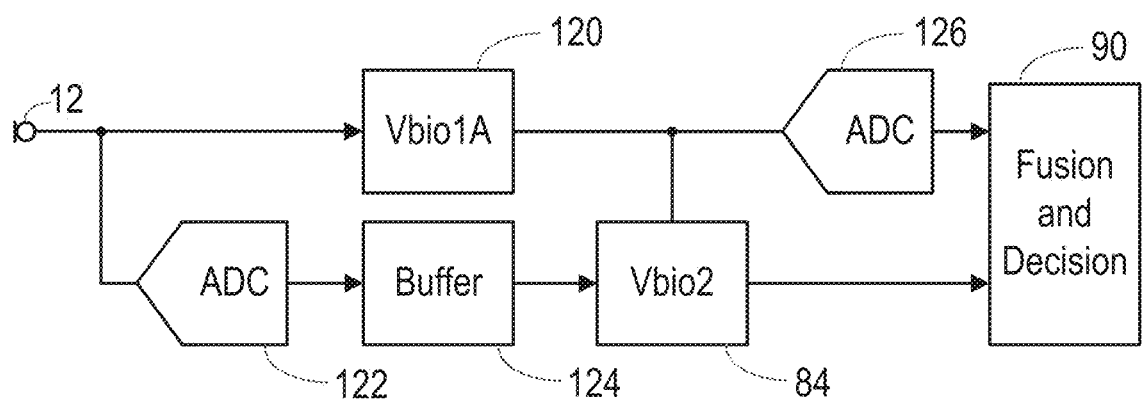
FIG. 6 is an example block diagram illustrating an alternative system for analysing an audio signal.

FIG. 6 is a block diagram illustrating functional blocks in the analysis system in that case.

As in FIGS. 4 and 5, an audio signal, which is expected to contain speech, is generated by a microphone 12 in response to the detected sound.

As before, the audio signal may for example be expected to contain the speech of a specific speaker, who has previously enrolled in the speaker recognition system. In that case, the aim of the method may be to determine whether the person speaking is indeed the enrolled speaker, in order to determine whether any commands that are spoken by that person should be acted upon.

The signal generated by the microphone 12 is passed to a first voice biometric block, which in this embodiment is an analog processing circuit (Vbio1A) 120, that is a computing circuit constructed using resistors, inductors, op amps, etc. This performs a first voice biometric process on the audio signal. As is conventional for a voice biometric process, this attempts to identify, as in step 64 of the process shown in FIG. 3, whether the speech is the speech of an enrolled speaker.

If the first voice biometric process performed in the first voice biometric block 120 determines that the speech is not the speech of the enrolled speaker, the process ends. Any speech thereafter may be disregarded, until such time as there is evidence that a different person has started speaking.

Separately, the signal generated by the microphone 12 is passed to a pre-processing block, which includes at least an analog-digital converter (ADC) 122, for converting the signal into a digital form. The pre-processing block may also divide the received signal into frames, which may for example have lengths in the range of 10-100 ms.

The signal output from the pre-processing block including the analog-digital converter 122 is passed to a buffer 124, the output of which is connected to a second voice biometric block (Vbio2) 84. If the first voice biometric process makes a provisional or initial determination that the speech might be the speech of the enrolled speaker, the second voice biometric block 84 is activated, and the relevant part of the data stored in the buffer 124 is output to the second voice biometric block 84.

Then, a second voice biometric process is performed on the relevant part of the audio signal that was stored in the buffer 124. Again, this second biometric process attempts to identify whether the speech is the speech of an enrolled speaker.

The second voice biometric process is selected to be more discriminative than the first voice biometric process.

For example, the term "more discriminative" may mean that the second voice biometric process is configured to have a lower False Acceptance Rate (FAR), a lower False Rejection Rate (FRR), or a lower Equal Error Rate (EER) than the first voice biometric process.

The analog first voice biometric process will typically use analog computing circuitry, and will therefore typically be a relatively low power process, compared to the second voice biometric process. This means that the first voice biometric process can be running on all signals that are considered to contain a noticeable signal level, without the need for a separate voice activity detector.

As mentioned above, in some embodiments, the second voice biometric block 84 is activated when the first voice biometric process has completed, and has made a provisional or initial determination based on the whole of a speech segment that the speech might be the speech of the enrolled speaker. In other embodiments, in order to reduce the latency of the system, the second voice biometric block 84 is activated before the first voice biometric process has completed. In those embodiments, the provisional or initial determination can be based on an initial part of a speech segment or alternatively can be based on a partial calculation relating to the whole of a speech segment. Further, in such cases, the second voice biometric block 84 is deactivated if the final determination by the first voice biometric process is that there is a relatively low probability the speech is the speech of the enrolled speaker.

For example, the second voice biometric process may be a voice biometric process selected from a group comprising: a neural net (NN) process; a Joint Factor Analysis (JFA) process; a Tied Mixture of Factor Analyzers (TMFA); a method using machine learning techniques such as Deep Neural Nets (DNNs) or Convolutional Neural Nets (CNNs); and an i-vector process or an x-vector process, amongst others.

As described above with reference to FIGS. 4, 5 and 6, the first voice biometric process makes an initial attempt to identify whether the speech is the speech of the enrolled speaker. If that process determines that there is a sufficiently high probability that the speech is the speech of the enrolled speaker, the second voice biometric process makes an attempt to identify whether the speech is the speech of the enrolled speaker.

As shown in FIG. 4, one possibility is that the output from the second voice biometric process 84 is passed to a decision block 86, which decides whether to accept that the speech is the speech of the enrolled speaker. For example, the second voice biometric process 84 may generate a likelihood score, and the decision block 86 may compare this with a threshold value, with that threshold value potentially being set based on a required security level. Thus, in a low security application, the threshold value may be set to be low, ensuring a low False Rejection Rate but with an increased False Acceptance Rate. In a higher security application, the threshold value may be set to be high, ensuring a low False Acceptance Rate, but with an increased False Rejection Rate. As noted above, however, the second voice biometric process 84 may be a relatively computationally expensive process, so that in any event the combination of the False Acceptance Rate and the False Rejection Rate (or the Equal Error Rate) is better than can be obtained from the first voice biometric process.

As shown in FIGS. 5 and 6, an alternative possibility is that the outputs from the first voice biometric process 82, 120 and from the second voice biometric process 84 are both passed to a fusion and decision block 90. In the case of the embodiment shown in FIG. 6, depending on the form of the result signal that is output from the analog computing process 120, this signal may be passed to an analog-digital converter (ADC) 126 to put the signal into a digital form before passing it to the fusion and decision block 90. The fusion and decision block 90 combines the scores from the two processes and decides whether to accept that the speech is the speech of the enrolled speaker.

For example, with a score $S_1$ generated by the first voice biometric process 82 and a score $S_2$ generated by the second voice biometric process, the combined score $S_T$ may be a weighted sum of these two scores, i.e.:

$$S_T = aS_1 + (1-\alpha)S_2.$$

Alternatively, the fusion and decision block 90 may combine the decisions from the two processes and decide whether to accept that the speech is the speech of the enrolled speaker.

For example, with a score $S_1$ generated by the first voice biometric process 82 and a score $S_2$ generated by the second voice biometric process, it is determined whether $S_1$ exceeds a first threshold th1 that is relevant to the first voice biometric process 82 and whether $S_2$ exceeds a second threshold th2 that is relevant to the second voice biometric process. The fusion and decision block 90 may then decide to accept that the speech is the speech of the enrolled speaker if both of the scores exceeds the respective threshold.

Combining the results of the two biometric processes means that the decision can be based on more information, and so it is possible to achieve a lower Equal Error Rate than could be achieved using either process separately.

As noted above, the first and second voice biometric processes may both be performed in a device such as the smartphone 10. However, in other examples, the first and second voice biometric processes may be performed in separate devices.

Figure 7:
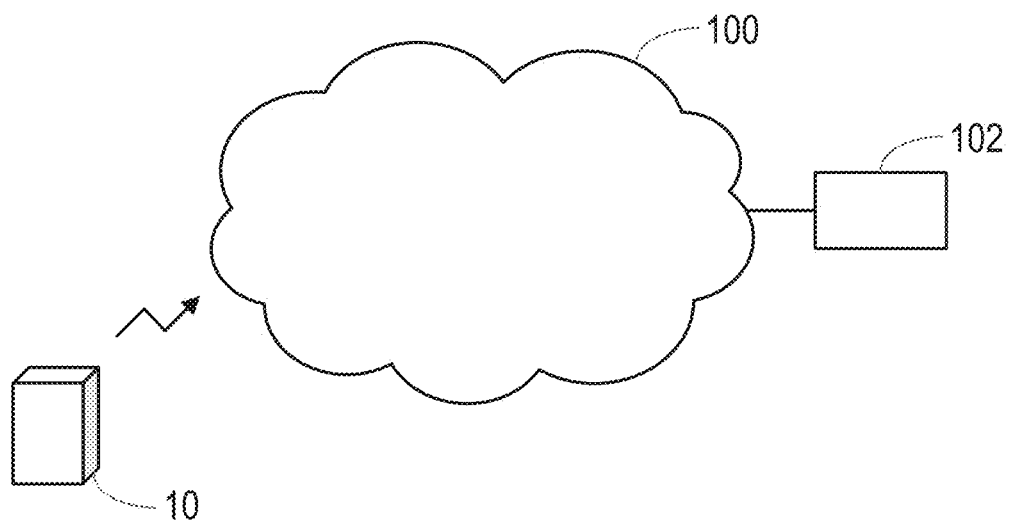
FIG. 7 illustrates an example use of the method of FIG. 3.

For example, as shown in FIG. 7, the first voice biometric process may be performed in a device such as the smartphone 10. Then, the received audio signal may be transmitted over a network 100 to a remote device (for example a cloud-based biometric processor 102) using the transceiver 18 only in the event that the first voice biometric process has made a provisional or initial determination that the speech might be the speech of the enrolled speaker. The second voice biometric process may then be performed in the remote device 102.

Figure 8:
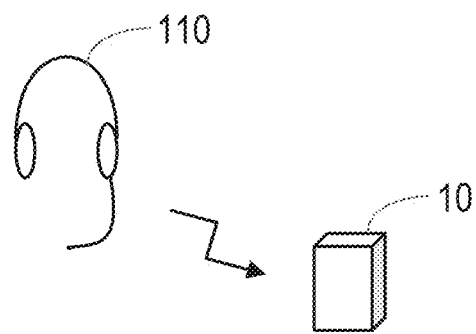
FIG. 8 illustrates a second example use of the method of FIG. 3.

As another example, as shown in FIG. 8, an accessory such as a headset 110 or other listening device such as a pair of earbuds, may be in use in conjunction with a device such as the smartphone 10. In that case, the first voice biometric processes may be performed in the accessory device such as the headset 110. Then, the received audio signal may be transmitted to the smartphone 10 only in the event that the first voice biometric process has made a provisional or initial determination that the speech might be the speech of the enrolled speaker. The second voice biometric processes may then be performed in the smartphone 10. Thus, wireless transmission circuitry in the accessory device may be activated, to transmit data to the host device, only when it is determined in the accessory device that the speech might be that of the enrolled speaker. The accessory device may for example comprise a wearable device such as a headset device, a smart glasses device, or a smart watch device. The host device may comprise a device such as a mobile phone or tablet computer.

In further embodiments, the first voice biometric process can be performed in a first device, which may be a wearable device, while the second voice biometric process can be performed in a second device, which may be a different wearable device. For example, if the first voice biometric process is performed in a first device such as a headset, and the second voice biometric process is performed in a second device such as a watch, where the second device has greater onboard battery power and/or greater onboard computing power, the second device is effectively acting as the host device.

In some situations, the first voice biometric process might itself be divided between two accessory devices. For example, a first component of the first voice biometric process can be performed in a first accessory device, which may be a wearable device such as a headset, while a second component of the first voice biometric process can be performed in a second accessory device, which may be a different wearable device. Again, this may take advantage of different amounts of battery power and/or computing power in the two devices. The results of the first and second components of the first voice biometric process can be fused or combined, to produce a result, with a received audio signal being transmitted to the smartphone 10 only in the event that the combined result of the first voice biometric process leads to a provisional or initial determination that the speech might be the speech of the enrolled speaker.

In addition, even when the first and second voice biometric processes are both performed in a device such as the smartphone 10, they may be performed in separate integrated circuits.

Figure 9:
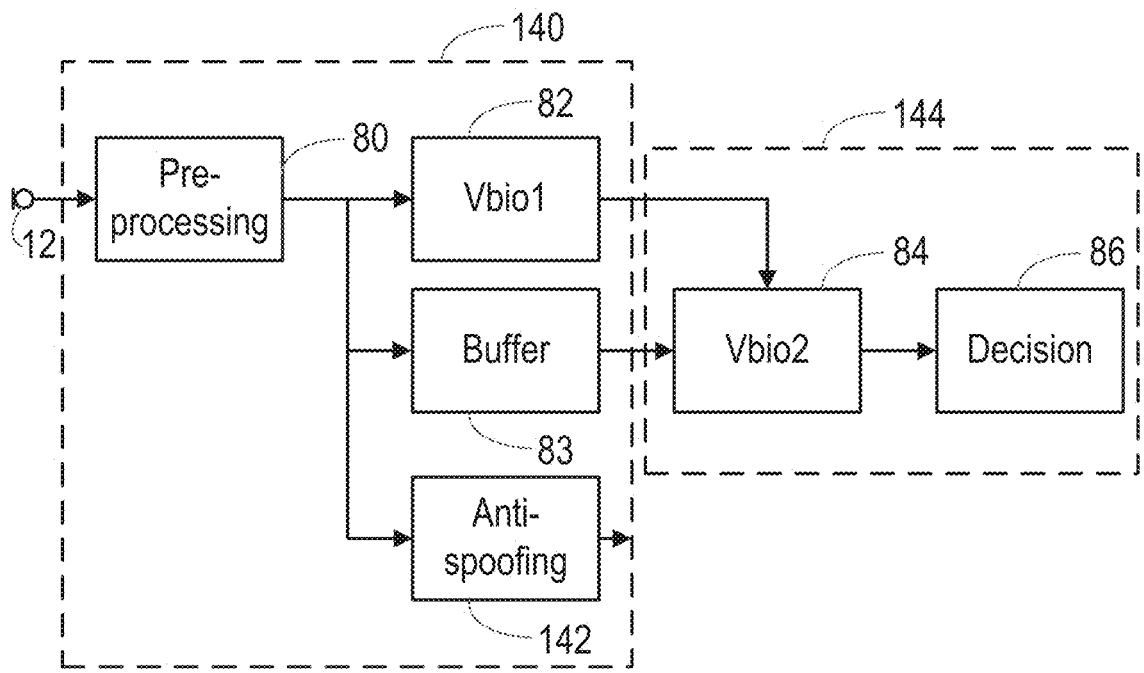
FIG. 9 is an example block diagram illustrating a further system for analysing an audio signal.

FIG. 9 shows one example of separated integrated circuits. FIG. 9 corresponds generally to FIG. 4, but shows that the pre-processing block 80, the first voice biometric process 82, and the buffer 83 are provided on a first integrated circuit 140, for example a dedicated low-power biometrics chip. This chip may operate in an "always on" manner, such that all received signals are passed to the first biometric process 82. In that case, the first biometric process 82 may act as a voice activity detector.

Alternatively, the first biometric process 82 may be activated in response to a voice activity detector (either within the pre-processing block 80 or separate from the first integrated circuit 140) determining that the signal contains speech. In some embodiments, the first integrated circuit may be a codec, or may be part of a digital microphone device or chip, or a smart codec or speaker amplifier chip.

In addition, the first integrated circuit 140 may contain an anti-spoofing block 142, for performing one or more tests on the received signal to determine whether the received signal has properties that may indicate that it results not from the user speaking into the device, but from a replay attack where a recording of the enrolled user's voice is used to try and gain illicit access to the system. If the output of the anti-spoofing block 142 indicates that the received signal may result from a replay attack, then this output may be used to prevent the second voice biometric process being activated, or may be used to gate the output from the first integrated circuit 140. Alternatively, the output of the anti-spoofing block 142 may be passed to the decision block 86 for its use in making its decision on whether to act on the spoken input. It will be understood that the anti-spoofing block 142 may be arranged to perform a plurality of separate anti-spoofing processes, as described below, the outputs of which may be fused together into a single anti-spoofing output.

Meanwhile, the second voice biometric process 84 and the decision block 86 are provided on a second integrated circuit 144, for example a high-power, high-performance chip, such as the applications processor or other processor of the smartphone, or a dedicated biometrics processor device or chip.

Figure 10:
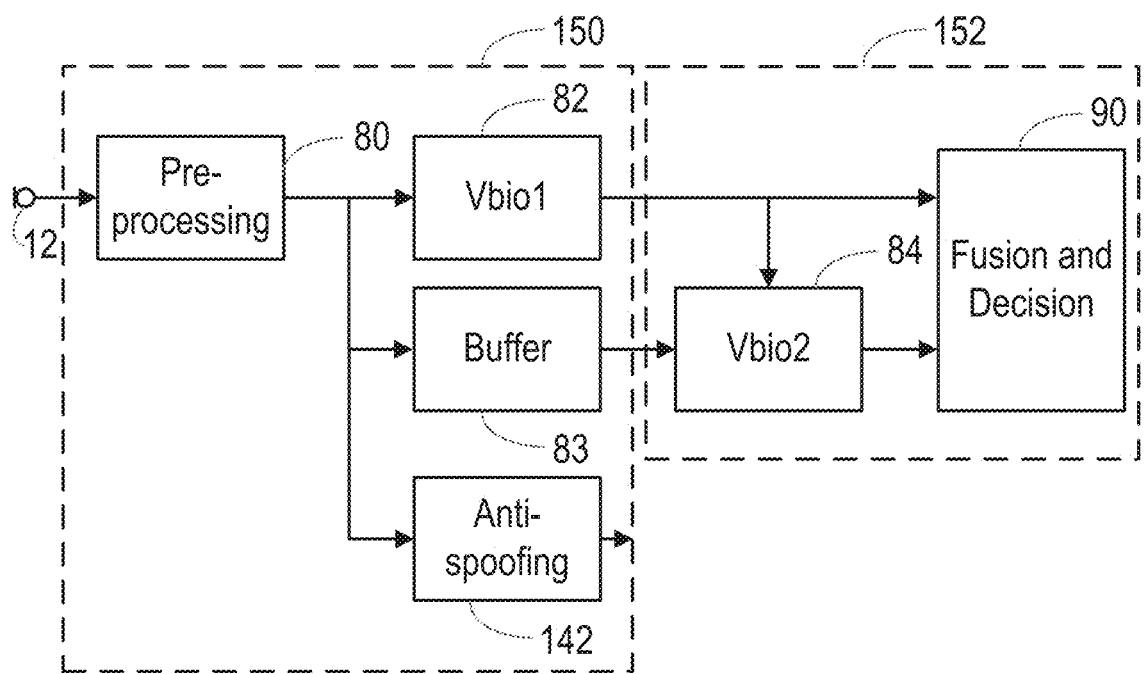
FIG. 10 is an example block diagram illustrating a further system for analysing an audio signal.

FIG. 10 shows another example of separated integrated circuits. FIG. 10 corresponds generally to FIG. 5, but shows that the pre-processing block 80, the first voice biometric process 82, and the buffer 83 are provided on a first integrated circuit 150, for example a dedicated low-power biometrics chip. This chip may operate in an "always on" manner, such that all received signals are passed to the first biometric process 82. In that case, the first biometric process 82 may act as a voice activity detector. Alternatively, the first biometric process 82 may be activated in response to a voice activity detector (either within the pre-processing block 80 or separate from the first integrated circuit 150) determining that the signal contains speech.

In addition, the first integrated circuit 150 may contain an anti-spoofing block 142, for performing one or more tests on the received signal to determine whether the received signal has properties that may indicate that it results not from the user speaking into the device, but from a replay attack where a recording of the enrolled user's voice is used to try and gain illicit access to the system. If the output of the anti-spoofing block 142 indicates that the received signal may result from a replay attack, then this output may be used to prevent the second voice biometric process being activated, or may be passed to the fusion and decision block 90 for its use in making its decision on whether to act on the spoken input.

Meanwhile, the second voice biometric process 84 and the fusion and decision block 90 are provided on a second integrated circuit 152, for example a high-power, high-performance chip, such as the applications processor of the smartphone.

While in the described embodiments, the pre-processing block 80 is used to output a framed or sampled digital signal for further processing, it will be understood that the pre-processing block 80 may additionally or alternatively be configured to output a continuous digital signal, and/or an analog signal from the microphone 12. It will be understood that the pre-processing block 80 may be configured to provide different output signals to different downstream processing modules. For example, the pre-processing block 80 may provide the first voice biometric process 82 with a framed digital signal, and in parallel provide the anti-spoofing block 142 with a streamed continuous analog or digital signal for anti-spoof processing.

Figure 11:
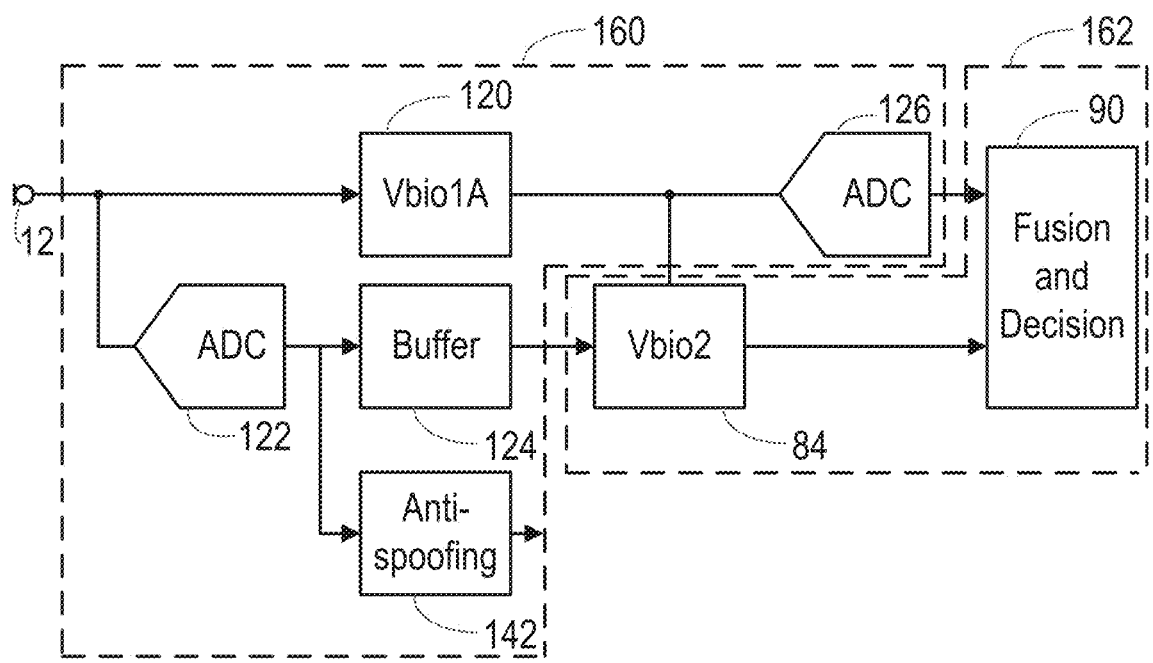
FIG. 11 is an example block diagram illustrating a further system for analysing an audio signal.

FIG. 11 shows another example of this division of the functionality. FIG. 11 corresponds generally to FIG. 6, but shows that the analog first voice biometric process 120, the analog-digital converters (ADCs) 122, 126, and the buffer 124 are provided on a first integrated circuit 160, for example a dedicated low-power biometrics chip. This chip may operate in an "always on" manner, such that all received signals are passed to the analog first biometric process 120. In that case, the first biometric process 120 may act as a voice activity detector.

In addition, the first integrated circuit 160 may contain an anti-spoofing block 142, for performing one or more tests on the received signal to determine whether the received signal has properties that may indicate that it results not from the user speaking into the device, but from a replay attack where a recording of the enrolled user's voice is used to try and gain illicit access to the system. If the output of the anti-spoofing block 142 indicates that the received signal may result from a replay attack, then this output may be used to prevent the second voice biometric process being activated, or may be passed to the fusion and decision block 90 for its use in making its decision on whether to act on the spoken input.

Meanwhile, the second voice biometric process 84 and the fusion and decision block 90 are provided on a second integrated circuit 162, for example a high-power, high-performance chip, such as the applications processor of the smartphone.

It was mentioned above in connection with FIGS. 9 and 10 that the first biometric process 82 may act as a voice activity detector. Similarly, it was mentioned in connection with FIG. 11 that the first biometric process 120 may act as a voice activity detector. A voice biometric may be used as a voice activity detector because there is a similarity between the processes. A voice biometric process typically compares features extracted from the received speech against a voiceprint that is made of features extracted from the enrolled user's speech. If the similarity score exceeds a particular threshold, meaning that the degree of similarity is high enough, then the received speech is considered to be that of the enrolled user. If it is determined by the first voice biometric process that the speech is the speech of an enrolled user, this determination may be used as an indication that the received audio signal comprises speech.

The similarity score may also be compared with a lower threshold. If the similarity score exceeds that lower threshold, then this condition will typically be insufficient to say that the received signal contains the speech of the enrolled user, but it will be possible to say that the received signal does contain speech.

Similarly, it may be possible to determine that the received signal does contain speech, before it is possible to determine with any certainty that the received signal contains the speech of the enrolled user. For example, in the case where the first voice biometric process is based on analysing a long-term spectrum of the speech, it may be necessary to look at, say, 100 frames of the signal in order to obtain a statistically robust spectrum, that may be used to determine whether the specific features of that spectrum are characteristic of the particular enrolled speaker. However, it may already be possible after a much smaller number of samples, for example 10-20 frames, to determine that the spectrum is that of human speech rather than of a noise source, a mechanical sound, or the like.

Thus, in this case, while the first voice biometric process is being performed, an intermediate output may be generated and used as a voice activity detection signal. This intermediate output may be supplied to any other processing block in the system, for example to control whether a speech recognition process should be enabled.

In a further aspect of the invention, it will be understood that the first integrated circuits 140, 150, 160 may be provided with information relating to the specific microphone 12 or audio transceiver to which the circuit is coupled to receive the audio signal. Such information may comprise characteristic information about the device performance e.g. nonlinearities in device operation. Such information may comprise pre-loaded data which may be programmed into the first integrated circuit 140, 150, 160 during manufacture, i.e. when it is known what specific microphone 12 or other audio transceiver is being used. Additionally or alternatively, the first integrated circuit 140, 150, 160 may be provided with a monitoring module which is configured to monitor the operation of the microphone 12 to track any operational drift or variations in the performance of the component, e.g. due to temperature changes, device wear-and-tear, etc. Such monitoring may be accomplished through the use of suitable voltage or current monitoring systems coupled to the microphone 12.

Such characteristic information may be used as an input to the respective processing modules of the circuits 140, 150, 160, such that the device-specific information may be taken account in the processing of data from the microphone 12. For example, the first biometric process 82 or the anti-spoofing module 142 may take account of characteristic nonlinearities present in the microphone 12 to ensure that the respective outputs of such modules 82 or 142 are corrected for any device-specific irregularities.

In any of FIGS. 9, 10 and 11, the first integrated circuits 140, 150, 160 may be provided separately from the respective second integrated circuits 142, 152, 162. That is, any one of the first integrated circuits 140, 150, 160 may be supplied as a stand-alone device, which may then be connected to any other device providing any required functionality. Similarly, any one of the second integrated circuits 142, 152, 162 may be supplied as a stand-alone device, which may then be connected to receive inputs from any other device providing the required signals.

Data Integrity

In various examples described above, a first biometric process is performed on some data representing speech, and a second biometric process may also be performed. The intention is that, if the second biometric process is performed, it should be performed on the same data as that on which the first biometric process is performed. In order to ensure that this is the case, a data integrity process may also be performed.

In general terms, digital data representing speech is received at a first processor for performing a first voice biometric process. In FIGS. 4 and 5, and in FIGS. 9 and 10, this first processor is the first voice biometric block (Vbio1)

82. The first voice biometric block 82 performs a biometric process on the data to attempt to identify whether the speech is the speech of an enrolled speaker. In addition, the first voice biometric block 82 generates a Message Authentication Code or Message Authentication Certificate (MAC). In some embodiments, the first voice biometric block 82 may generate the MAC only if the first voice biometric process makes an initial determination that the speech is the speech of an enrolled user. If the first voice biometric process makes an initial determination that the speech is the speech of an enrolled user, the first voice biometric block 82 may send a signal to a second processor to activate it. This activation signal may include the generated MAC.

The digital data representing speech may also be received at a second processor for performing a second voice biometric process. In FIGS. 4 and 5, and in FIGS. 9 and 10, this second processor is the second voice biometric block (Vbio2) 84. If the second voice biometric block 84 is activated, it performs a second biometric process on the data to attempt to identify whether the speech is the speech of an enrolled speaker. The second voice biometric block 84 may be activated by an activation signal received from the first voice biometric block 82, and this activation signal may also include the Message Authentication Certificate (MAC) generated by the first voice biometric block 82.

In this case, the second voice biometric block 84 also generates a Message Authentication Certificate (MAC). The second voice biometric block 84 then compares the MAC that it has generated with the MAC that it received from the first voice biometric block 82. Since each MAC is calculated as a function of the received data, and since the first voice biometric block 82 and the second voice biometric block 84 should receive the same data, the two MACs may be compared, and it is expected that they should be found to be the same. If they are found to be different, then this may indicate that the system has been subject to an attack by injecting invalid data, and the authentication process may be terminated.

One example of how a suitable MAC may be generated and verified by the first voice biometric block 82 and the second voice biometric block 84 is to pass the received digital data to a hash module which performs a hash of the data in appropriate frames. The hash module may determine a hash value, H, for example according to the known SHA-256 algorithm as will be understood by skilled in the art, although other hash functions may also be appropriate.

In the first voice biometric block 82, the hash value may be digitally signed using a signing module. The signing module may apply a known cryptographic signing protocol, e.g. based on the RSA algorithm or Elliptic-curve-cryptography (ECC) using a private key $K_{Private}$ that is known to the first voice biometric block 82.

In one example, a 256 bit hash value, H, is calculated by the hash module, and the signing module pads this value to a higher bit hash, for instance a 2048 bit padded hash, P, as would be understood by one skilled in the art. Using the private key, $K_{Private}$ (d,N) the Message Authentication Certificate (MAC), e.g. a 2048-bit MAC, is generated using modular exponentiation, e.g. the MAC is generated by raising P to power of d modulo N:

$$MAC = P^d \bmod N$$

In one example, the exponent d is a 32-bit word and the modulus N is a 2048-bit word. The MAC is then transmitted to the second voice biometric block 84 as required. The MAC may be encoded with the activation signal, or may simply be added to the activation signal to be transmitted in a predefined way, e.g. as the first or last 2048 bits defined with respect to some frame boundary.

When the second voice biometric block (Vbio2) 84 receives the MAC, it can extract the hash that was used to generate the MAC. The MAC may be passed to a cryptographic module where, using the public key $K_{Public}$ (e, N) and the corresponding RSA or ECC algorithm, the value of the signed padded hash value $P_S$ may be extracted by raising the MAC to the power of e modulo N. The full domain hash may thus be calculated as:

$$P_S = MAC^e \bmod N$$

The second voice biometric block (Vbio2) 84 also includes a hash module that performs the same hash and padding process using the data that it has received from the buffer 83, as was applied by the first voice biometric block (Vbio1) 82 on its received data. This process determines a padded hash value $P_R$ for the received data. The two padded hash values $P_S$ and $P_R$ may then be compared, and a data validity signal generated indicating that the data is valid, if the two padded hash values are the same, or that the data is invalid, if the values differ.

The above description of the algorithms used and the various bit lengths is by way of example only and different algorithms and/or bit lengths may be used depending on the application. In some instances, padding of the hash value may not be required. It will be understood that the discussion above has focussed on asymmetric key based signing, i.e. the use of public and private keys. However, the signing could additionally or alternatively involve some symmetric signing, e.g. based on a mutual shared secret or the like.

In a further aspect, the system may be configured to perform speculative automatic speech recognition (ASR), wherein an ASR module is engaged to recognise speech e.g. voice commands, in the received audio. To ensure that the ASR module is operating on the same speech as has been verified by a biometrics module, a data integrity checking system may be employed. An example of such a system is as described in co-pending U.S. patent application Ser. No. 16/115,654, which is incorporated by reference herein. It will be understood that such a system configuration may be also utilised for a speculative secondary biometric process, as described below, wherein the ASR module may be replaced by the secondary biometric process.

FURTHER EMBODIMENTS

An implementation of a speaker verification system and method is now described in relation to FIGS. 12-16.

Figure 12:
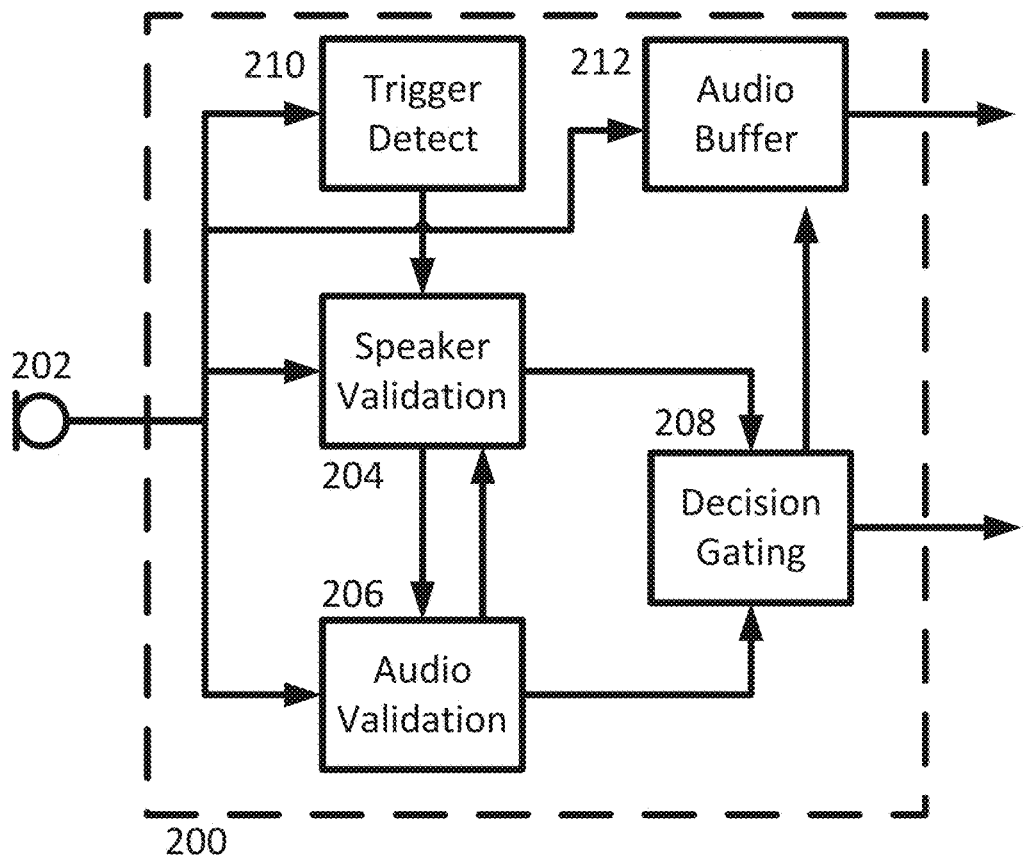
FIG. 12 is an example block diagram illustrating a preferred implementation of the invention.

In FIG. 12, a speaker verification system 200 is shown, which receives audio comprising speech from an input 202 such as a microphone or any other suitable interface or audio transceiver for receiving audio signals. The system 200 comprises a speaker validation module 204, and an audio validation module 206. The speaker validation module 204 performs an initial speaker validation process on the received audio from the input 202, and provides outputs in the form of a speaker ID score representing an initial likelihood that the received speech is from a particular speaker and a sound classification representing the likelihood that the received speech is a particular acoustic class.

The audio validation module 206 is configured to determine if the received audio is valid or invalid. In particular, the audio validation module 206 is configured to detect if the received audio is all from a single speaker, and/or to determine if the received audio is genuine audio, or is the product of a spoof or replay attack, wherein a hacker or other malicious actor is trying to deceive the speaker verification system 200. The speaker validation module 204 is coupled with the audio validation module 206, such that the audio validation module 206 makes the determination on whether the received audio is valid or invalid based at least in part on the output of the speaker validation module 204. In particular, the output of the audio validation module 206 is based at least in part on the sound classification representing the likelihood that the received speech is a particular acoustic class, which is output by the speaker validation module 204. By using the sound classification output from the speaker verification process in the audio validation process, accordingly the resources required for such an audio validation process may be minimised, and associated latency reduced.

The output of the audio validation module 206 is used in a decision gating module 208, such that the output of the speaker verification system 200 is only allowed (a) when the speaker validation module 204 has made an initial determination that the received speech is the speech of an enrolled user, and (b) when the audio validation module 206 has determined that the received audio is valid. Accordingly, the output of the audio validation module 206 is used to gate the output of the speaker validation module 204 at the gating module 208. Gating the speaker verification output by using an audio validity check to confirm that the received audio is valid ensures that the speaker verification result is only used for audio which is not from a replay attack or a spoof attack, and additionally or alternatively, ensures that the received audio used in the speaker verification is from the same speaker, and is not from a combative or tail-gating attack.

A combative speech attack occurs when the speaker changes between the initial voice trigger and the subsequent command (e.g. Speaker 1: "Hello Computer", Speaker 2: "Order me a beer"). A tail-gating speech attack occurs when a second speaker appends an additional command onto the end of a valid command from a first speaker (e.g. Speaker 1: "Hello Computer, order me a pizza", Speaker 2: "And a beer").

The output of the decision gating module 208 may be used as the input to a secondary biometrics system, e.g. to a second integrated circuit 144, 152, 162 as described in the embodiments above. In this regard, the output of the decision gating module 208 may be simply a trigger for a relatively more discriminative secondary biometrics scoring process, or the output of the decision gating module 208 may comprise the speaker ID score from the speaker validation module 204, which may be fused with a later biometrics module as described above.

The speaker verification system 200 may be provided with a trigger detection module 210, which is arranged to initialise at least a portion of the speaker verification system 200 on detection of a suitable trigger. Such a trigger may comprise a voice keyword detected in the received audio, e.g. a trigger phrase such as "Hello Computer" or similar. Additionally or alternatively, the trigger detection may receive inputs from other sources, e.g. system inputs such as button presses, proximity detection, optical sensors, etc. which may be indicative of user interaction with the speaker verification system 200. In the embodiment of FIG. 12, the trigger detection module 210 is coupled with the speaker validation module 204, such that at least a portion of the speaker validation module 204 is initialised in response to the detection of a suitable trigger, but it will be understood that the trigger detection module 210 may additionally or alternatively be coupled with the audio validation module 206 or the decision gating module 208, where at least a portion of such modules are initialised in response to the detection of a suitable trigger.

In an additional aspect, the speaker verification system 200 may be provided with an audio buffer 212 arranged to buffer the audio received from the input 202. Such a buffer 212 may be used as described in the above embodiments, wherein the buffered audio may be provided to a downstream biometrics module for further processing. The output of the buffer 212 from the system 200 may be controlled by the gating module 208, such that data is only sent for further processing when it is determined that the received audio is valid, and that the speaker validation module 204 has determined that the received audio comprises speech from an enrolled user. By outputting the buffered audio along with a valid speaker recognition output, accordingly further processing of the received audio may be performed, with an initial determination that the received audio is that of a particular speaker. Such additional processing may comprise speech recognition of the received audio for use in command processing, or the received audio may be processed using a more discriminative speaker recognition process, for example for relatively high security operations.

In some embodiments, an output of the audio validation module 206 may be used as an input to the speaker validation module 204, as described in more detail below.

Figure 13:
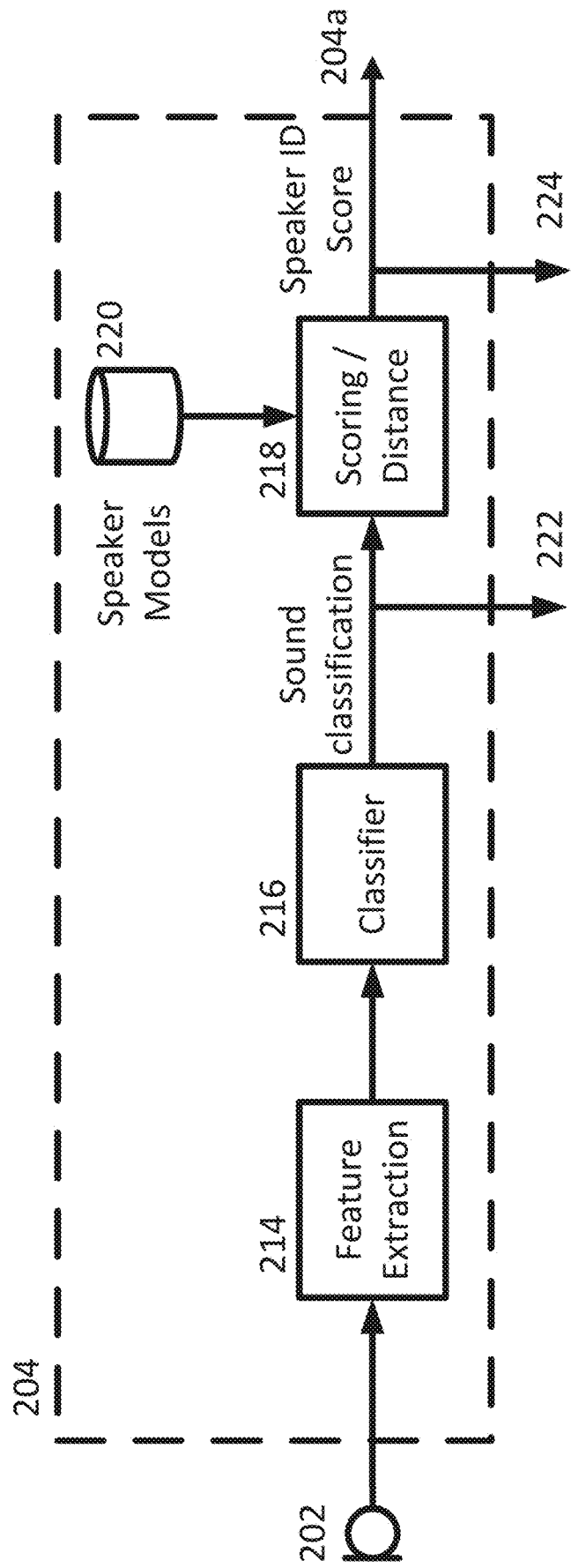
FIG. 13 is an example block diagram illustrating an embodiment of a first portion of the system of FIG. 12.

FIG. 13 shows an example implementation of the speaker validation module 204, which is arranged to receive audio comprising speech from input 202. The module 204 comprises a feature extraction module 214 which is configured to perform a feature extraction operation on the received audio. The feature extract version of the audio is then passed to a classifier module 216, which is arranged to perform a classification of the received audio, to identify what type of sounds are present in the received audio. The classification may be performed using any suitable classification process, e.g. a Gaussian Mixture Model (GMM) process, or may utilise a machine learning process wherein a neural net has been trained to recognise sound classes. The classifier module 216 will output an appropriate sound classification indicative of the sounds present in the received audio, which may be used in subsequent speaker recognition scoring as described below. In addition, the sound classification is provided as an output 222 from the speaker validation module 204, which may be used as an input to the audio validation module 206, as described above.

It will be understood that the sound classification may be provided as an indication of the acoustic classes present in received audio, for example sound mixtures, phonemes, phones, senones, etc.

Thus, the sound classification provides information about the distribution of detected acoustic classes within the total received audio. This may also be called the mixture model. The sound classification that is generated by the classifier 216 provides information about the sounds that are present in the speech, but also provides information about the identity of the person speaking, because the most likely mixtures produced from the speech of a first person uttering a specific sound will differ from the most likely mixtures produced from the speech of a second person uttering the same sound. Thus, a change in the most likely mixtures can correspond to a speaker change. The mixture can also be used by scoring it against a mixture model obtained for a particular speaker.

The sound classification could be generated frame-by-frame or could be generated over a group of frames. For example, a particular group of frames might correspond to a phoneme, though the length of each phoneme in an utterance will depend on the articulation rate, and the classification identifies which most likely mixtures correspond to the phoneme.

Within the speaker validation module 204, the sound classification is passed to a scoring or distance module 218, which acts to score the received audio against a series of stored speaker models 220 representing different enrolled speakers, based on the determined sound classification. The scoring may comprise calculating a distance metric for the distance the speech of the received audio is from the speech of an enrolled speaker, a probability metric that the speech of the received audio is the speech of an enrolled speaker, or a log likelihood ratio that the speech of the received audio is that of an enrolled speaker. The scoring may be performed using any suitable measures, e.g. a Joint Factor Analysis (JFA) based approach; a speaker recognition process based on tracking of the fundamental frequency of a speaker, for example as described in co-pending U.S. patent application No. 62/728,421, which is incorporated by reference herein; a machine learning or deep neural net based process (ML-DNN); etc.

Once the scoring has been completed, the speaker validation module 204 is configured to output a speaker ID score, which represents the likelihood that the received speech is from a particular speaker. The speaker ID score is provided as an output 224, which may be used as an input to the audio validation module 206 as described above. Where there are multiple enrolled speakers, as mentioned above, and hence multiple stored speaker models 220, the scoring or distance module 218 may output separate scores representing the respective likelihoods that the received speech is from those enrolled speakers. The speaker ID score may be further used as output 204a, which is used as an input to the decision gating module 208. It will be understood that the speaker validation module 206 may comprise any suitable speaker recognition system for example as described in "Fundamentals of Speaker Recognition", Homayoon Beigi. ISBN: 978-0-387-77592-0.

In some embodiments, the speaker validation module 204 may be configured to perform a plurality of different speaker recognition processes in parallel, and to combine or fuse the outputs of the different processes to provide the speaker ID score. Preferably, the plurality of different processes are selected to have low cross-correlation between the approaches, which translates into a robust and accurate speaker ID output.

Figure 14:
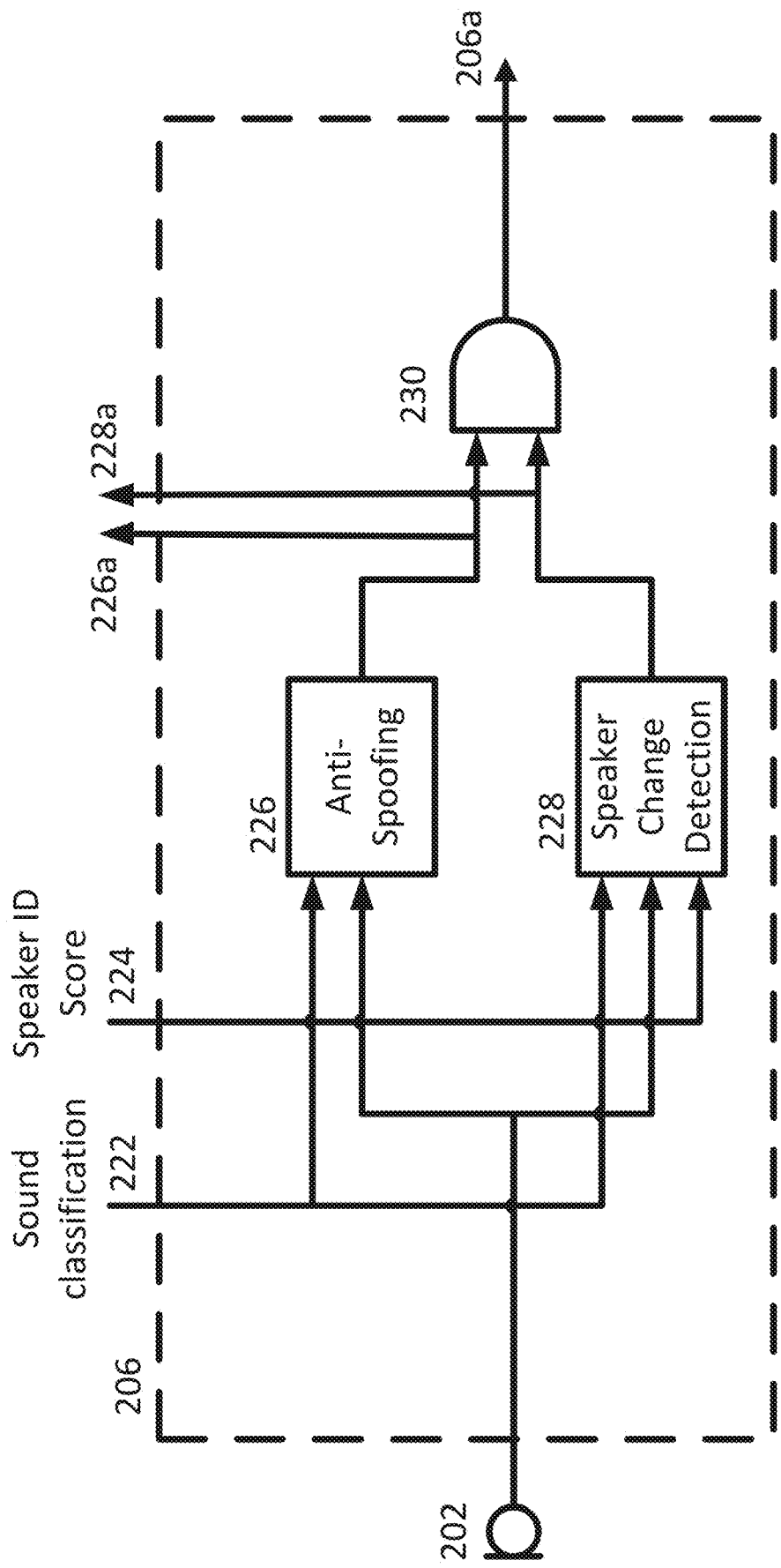
FIG. 14 is an example block diagram illustrating an embodiment of a second portion of the system of FIG. 12.

FIG. 14 shows an example implementation of the audio validation module 206, which is arranged to receive audio comprising speech from input 202. In addition, the audio validation module 206 receives as inputs the sound classification 222 and the speaker ID score 224 as calculated by the speaker validation module 204.

The audio validation module is arranged to determine whether or not the audio received at the input 202 is valid. Within the audio validation module 206, there is provided an anti-spoofing module 226 and a speaker change detection module 228.

The anti-spoofing module 226 is arranged to receive the sound classification 222 and the input audio 202, and to determine the probability of a replay attack or a presentation attack on the speaker verification system, for example through the use of replayed or synthesised audio to imitate a speaker.

An example of an anti-spoofing process using received audio and an indication of the acoustic classes present in speech may be found in co-pending U.S. patent application Ser. No. 16/050,593, which is incorporated by reference herein.

Additionally, the anti-spoofing process may comprise:
an ultrasonic-power-level-based anti-spoofing system, such as those described in co-pending U.S. patent application Ser. Nos. 62/571,944, 62/572,016, 15/980,491, which are incorporated by reference herein;
a magnetic-power-level-based anti-spoofing system, such as those described in co-pending U.S. patent application Ser. Nos. 16/020,406, 16/018,795, which are incorporated by reference herein;
a loudspeaker-detection-based anti-spoofing system, such as those described in co-pending U.S. patent application Ser. No. 62/571,959, 62/585,721, 62/585,660, 62/571,978, 16/017,072, which are incorporated by reference herein.

For cases where different anti-spoofing processes are performed, it will be understood that the outputs of such different anti-spoofing processes may be combined or fused to provide an anti-spoofing decision. In the case of combining or fusing the outputs, the output values of the different processes may be provided with different weights to account for such factors as the usage situations or environment, device characteristics, etc.

The speaker change detection module 228 is arranged to receive the input audio 202, the sound classification 222 and the speaker ID score 224, and to determine a change of speaker in the received audio based on some combination of the received inputs.

In one aspect, the speaker change detection module 228 is configured to implement a speaker change detection process based on a time-windowed biometric speaker ID score, such as that described in co-pending U.S. patent application Ser. No. 16/122,033, which is incorporated by reference herein.

Additionally or alternatively, the speaker change detection module 228 may be arranged to implement speaker change detection process based on:
monitoring for a change in the fundamental frequency, or F0, of the received audio;
monitoring for a change in the distribution of the phonetic or subphonetic acoustic classes of the received audio identified from the sound classification;
monitoring for a change in the fundamental frequency of the received audio for a particular acoustic class identified from the sound classification;
accent tracking;
emotion tracking; or
any other suitable speaker change detection method, such as that described in (Ajmera, Jitendra & Mccowan, Iain & Bourlard, Nerve. (2004). Robust Speaker Change Detection. Signal Processing Letters, IEEE. 11. 649-651. 10.1109/LSP.2004.831666), which is incorporated by reference herein.

By performing accurate speaker change detection (or SCD) on the received audio, the speaker verification system prevents exploitation by so-called combative or tail-gating attacks. In embodiments wherein multiple different SCD processes are performed, it will be understood that the outputs of such different SCD processes may be combined or fused to provide an SCD decision. In the case of combining or fusing the outputs, the output values of the different processes may be provided with different weights to account for such factors as the usage situations or environment, device characteristics, etc.

In some embodiments, and as shown in FIG. 12, the output of the audio validation module 206 may be used as an input to the speaker verification module 204. Such a configuration may be of use for embodiments where the speaker verification module 204 is operating in an always-on mode, to ensure that the speaker verification process is performed on correct portions of the received audio. For example, the output of the audio validation module 206 may be used to reset the operation of the speaker validation module 204.

For example, the output of the SCD module 228 may be used as an input to the speaker validation module 204, wherein the output of the SCD process module 228 sets a boundary on that portion of the received audio on which a speaker verification process should be performed. For example, if the SCD module 228 is configured to analyse speaker scores on an audio frame-by-frame basis to determine the point of speaker change, then the SCD output may define the total range of audio frames to process to determine the final speaker ID score, as it has been determined by the SCD module 228 that all of those frames are spoken by the same speaker. In some aspects, the output of the SCD module 228 may be used to reset the operation of the speaker validation module 204 on detection of a change in speaker in the received audio.

In a further example, in addition to identifying malicious attacks on the system, the anti-spoofing module 226 may also identify non-malicious environmental conditions that could affect accurate processing of the received audio. For example, a relatively high level of ultrasonics present in the received audio signal, e.g. from an ultrasonic motion sensor, may result in distortions or inaccurate outputs from the speaker validation module 204. Accordingly, the output from anti-spoofing module 226 may be used as an input to the speaker validation module 204 to set a boundary on portions of the received audio which are deemed to produce a safe and accurate speaker validation output. Most typically, this will mean that the speaker validation process is performed only on the speech of the intended speaker, in the event of a tail-gating speech attack. However, the anti-spoofing module 226 and the speaker validation module 204 may be configured such that the speaker validation process is performed only on the live speech of the intended speaker, in the event of a replay attack. In addition, the output of anti-spoofing module 226 may be used to reset the operation of the speaker validation module 204 in the event of detection of "unsafe" received audio.

The output of the anti-spoofing module 226 and the output of the speaker change detection module 228 may be combined or fused, for example using an AND gate 230, to provide an indication that the received audio is or is not valid. Such an indication may then be output by the audio validation module 206 as output 206a, for use in the decision gating module 208.

In an alternative embodiment, it will be understood that the output 206a of the audio validation module 206 may comprise both the output of the anti-spoofing module 226 and the output of the speaker change detection module 228, and wherein the fusion or combination of such outputs may be performed in the decision gating module 208, to provide an audio validity result.

In addition, for embodiments wherein the output of the audio validation module 206 is used as an input to the speaker verification module 204, it will be understood that the input to the speaker verification module 204 may comprise the combined or fused output 206a, and/or comprise some combination of the individual outputs of the anti-spoofing module 226 and the speaker change detection module 228, shown in FIG. 14 as outputs 226a and 228a respectively.

Figure 15:
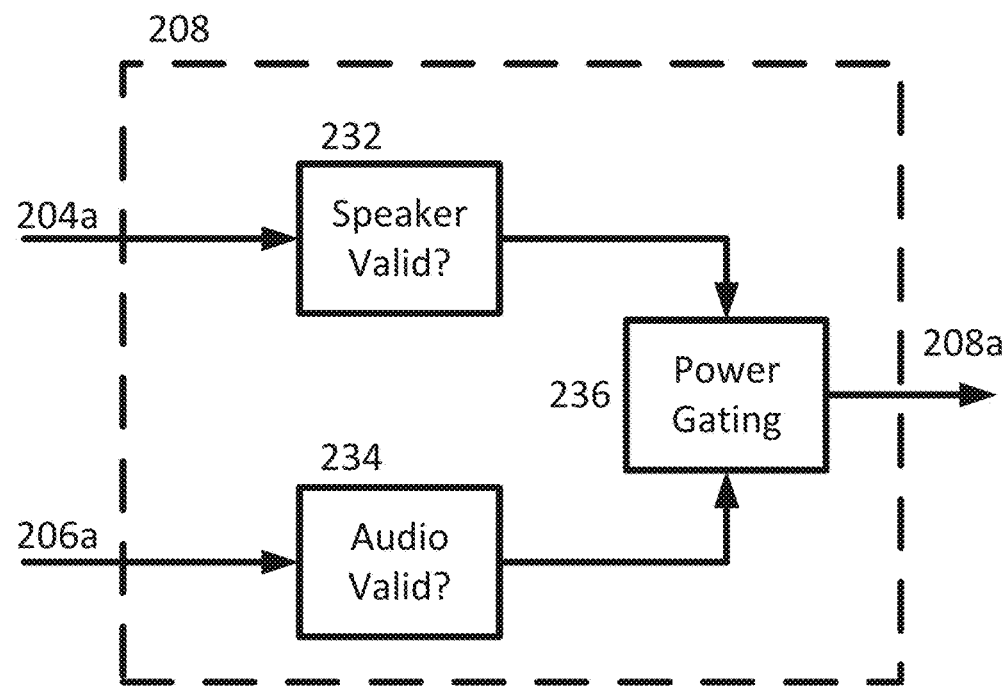
FIG. 15 is an example block diagram illustrating an embodiment of a third portion of the system of FIG. 12.

FIG. 15 provides an illustration of an embodiment of the decision gating module 208, which receives the output 204a of the speaker validation module 204 and the output 206a of the audio validation module 206. The decision gating module 208 comprises a speaker validity check 232 which checks whether a speaker has been identified from the received audio from the output 204a of the speaker validity module 204, and further comprises an audio validity check 234 which checks whether the received audio is valid from the output 206a of the audio validity module 206. If both checks are passed, the decision gating module 208 comprises a power gating or fusion module 236, which is arranged to generate an output signal 208a. The output 208a of the decision gating module 208 may comprise a simple enable signal to allow for the power-gating of downstream processing systems, as described above. In a further aspect, the output 208a may comprise an indicator of the speaker initially identified by the speaker validation module 204. Additionally or alternatively, the output 208a may comprise the speaker ID score 204a, which may be used in a subsequent score fusion operation as described above. The output 208a may further comprise the output 206a of the audio validation module 206, which may be provided as a single indicator of the validity of the received audio, or which may comprise separate outputs relating to the specific anti-spoofing or speaker change detection scores. The provision of such scores may allow for further downstream processing of anti-spoofing and/or speaker change detection processes. It will be understood that the output 208a of the decision gating module 208 may be used as the output signal from the speaker verification system 200.

In a preferred embodiment, and as described above, the output of the speaker verification system 200 may be used in combination with a secondary biometrics system, e.g. to a second integrated circuit 144, 152, 162 as described in the embodiments above, wherein the speaker verification system 200 is provided as a primary biometrics system, e.g. as the first integrated circuit 140, 150, 160 as described in the embodiments above. The primary biometrics scoring may be performed as part of a relatively low power system, e.g. an always-on system or a low-power island within a device such as a mobile phone handset or device accessory. Accordingly, the primary biometrics scoring is operable to power-gate the secondary biometrics scoring, which may be provided as part of a relatively high-power system, e.g. a device applications processor or dedicated biometrics chip having relatively high processing power. Preferably, the primary and secondary systems are selected to perform different biometrics scoring on the received audio.

In a preferred embodiment, the speaker recognition system is configured such that:
    the primary biometrics scoring is selected to have a relatively high False Acceptance Rate (FAR), and a relatively low False Rejection Rate (FRR); and
    the secondary biometrics scoring is selected to have a relatively low FAR, and a relatively high FRR.

Having such a configuration of scoring methods, any subsequent fusion of the biometric scores will result in a combined score having low FAR and low FRR.

Figure 16:
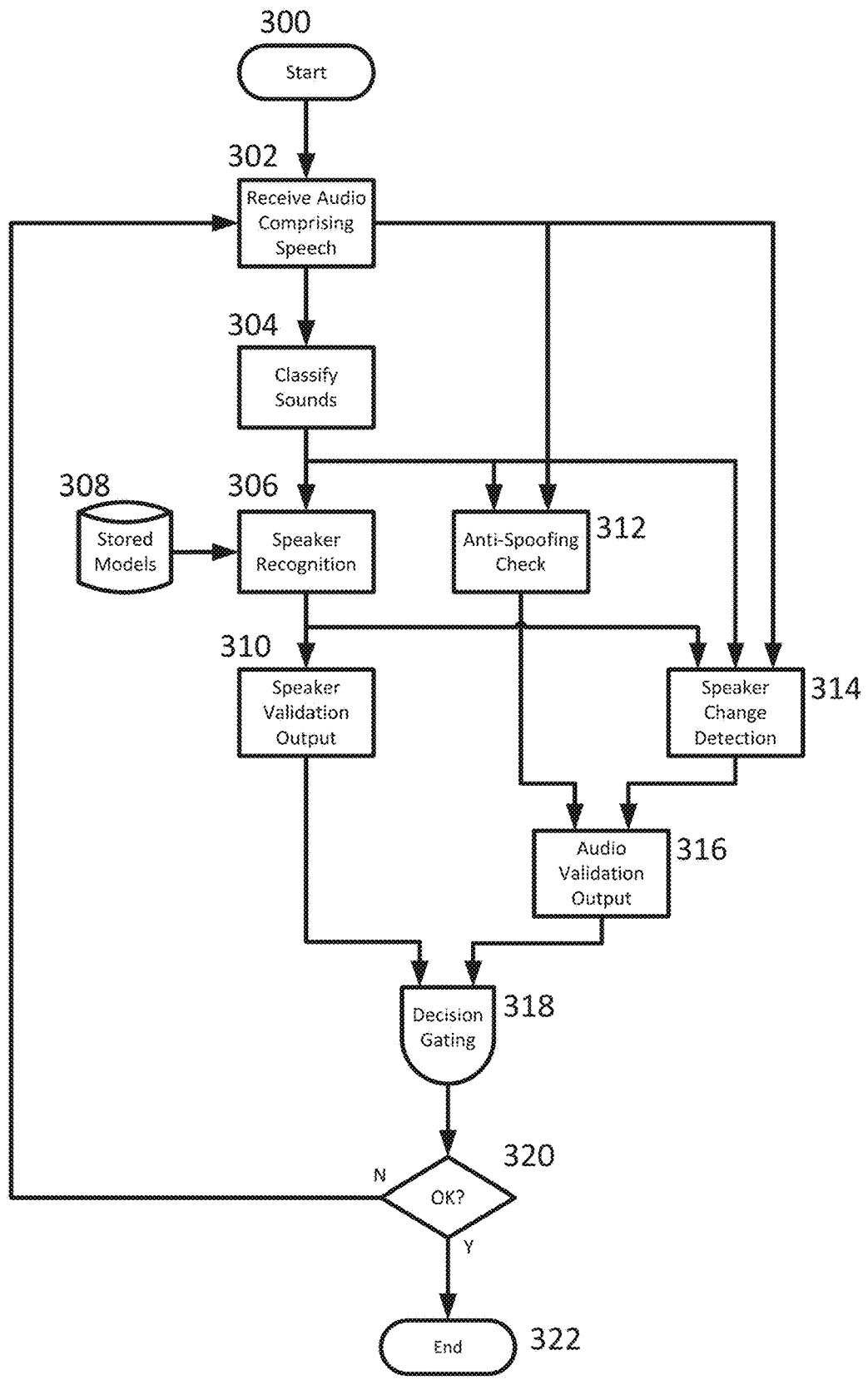
FIG. 16 is an example flow chart illustrating an embodiment of a method implemented by the system of FIG. 12.

FIG. 16 provides a flow chart for an embodiment of a speaker verification method implemented by the systems shown in FIGS. 12-15.

Upon start (step 300), the method receives audio comprising speech (step 302). As a first step performed by the speaker validation module 204, classification of the received audio is performed (step 304) to identify acoustic classes or sound mixtures present in the received audio. It will be understood that this step may comprise a feature extraction from the received audio.

After classification, speaker recognition is performed (step 306) based on stored speaker models (step 308) to at least initially identify the speaker from the received audio. The speaker recognition (step 306) produces a speaker ID score which may comprise a probability or likelihood that the speech is that of one specific enrolled speaker. The speaker ID score may then be used as the output 204a of the speaker validation module 204 (step 310).

In parallel to the operation of the speaker validation module 204, the audio validation module 206 is arranged to perform the steps of performing an anti-spoofing check (step 312) based on the received audio and the identified audio classification, and/or a speaker change detection check based on the received audio, the identified audio classification, and/or the speaker ID score (step 314). In the embodiment shown, the outputs of both the anti-spoofing check (step 312) and the speaker change detection check (314) are combined to provide the output 206a of the audio validation module 206 (step 316).

The outputs produced by steps 310 and 312 are combined at a decision gating check (step 318), which checks that a speaker has been identified for received audio, and that the received audio is valid. At step 320, if such a check is passed, then an output accordingly may be generated (step 322) which may be used for power gating and/or further downstream processing, as described above. If the check at 320 is not passed, then the system may return to receiving audio.

It will be understood that the system may be configured to provide further outputs based on the individual steps of the above-described method. For example, if the anti-spoofing module identifies that a spoof or a replay attack is taking place, the system may generate a warning to a user, or may act to restrict device access until a further authorisation check is passed. In addition, and as described above, the detection of a speaker change detection in the received audio may prompt the system to generate an output based on the total audio received for a specific speaker, the speaker change setting a boundary for the processing of the audio to identify a speaker from the received audio.

The above-described systems may be provided with additional security measures to prevent against malicious access to potentially sensitive data. In a preferred example, the systems may be configured to clear or wipe the contents of any data buffers based on the output of the various modules. For example, in the event of an anti-spoof module detecting that a spoof or a replay attack is taking place, the system may be arranged to wipe the contents of the audio buffers or any other buffers to prevent access to any sensitive data.

In the above-described systems, it will be understood that the individual biometric scoring systems, speaker recognition systems, anti-spoofing systems, and/or speaker change detection systems may comprise a plurality of different respective scoring systems, wherein the output of such systems may be combined or fused to provide a single output.

In a further aspect of the invention, and in an effort to reduce the overall latency of the system, the output of the first biometric process may be used to speculatively initiate the second biometric process. In particular, the speculative starting of the second biometric process may be initiated once the output of the first biometric process has reached a first threshold value indicative that an enrolled user has been provisionally recognised by the first biometric process. For example, the output of the first biometric process may comprise a probability estimate that the received speech is that of an enrolled speaker, wherein a confidence level that such a probability estimate is correct increases over time, due to the greater duration of received speech available to the first biometric process.

Figure 17:
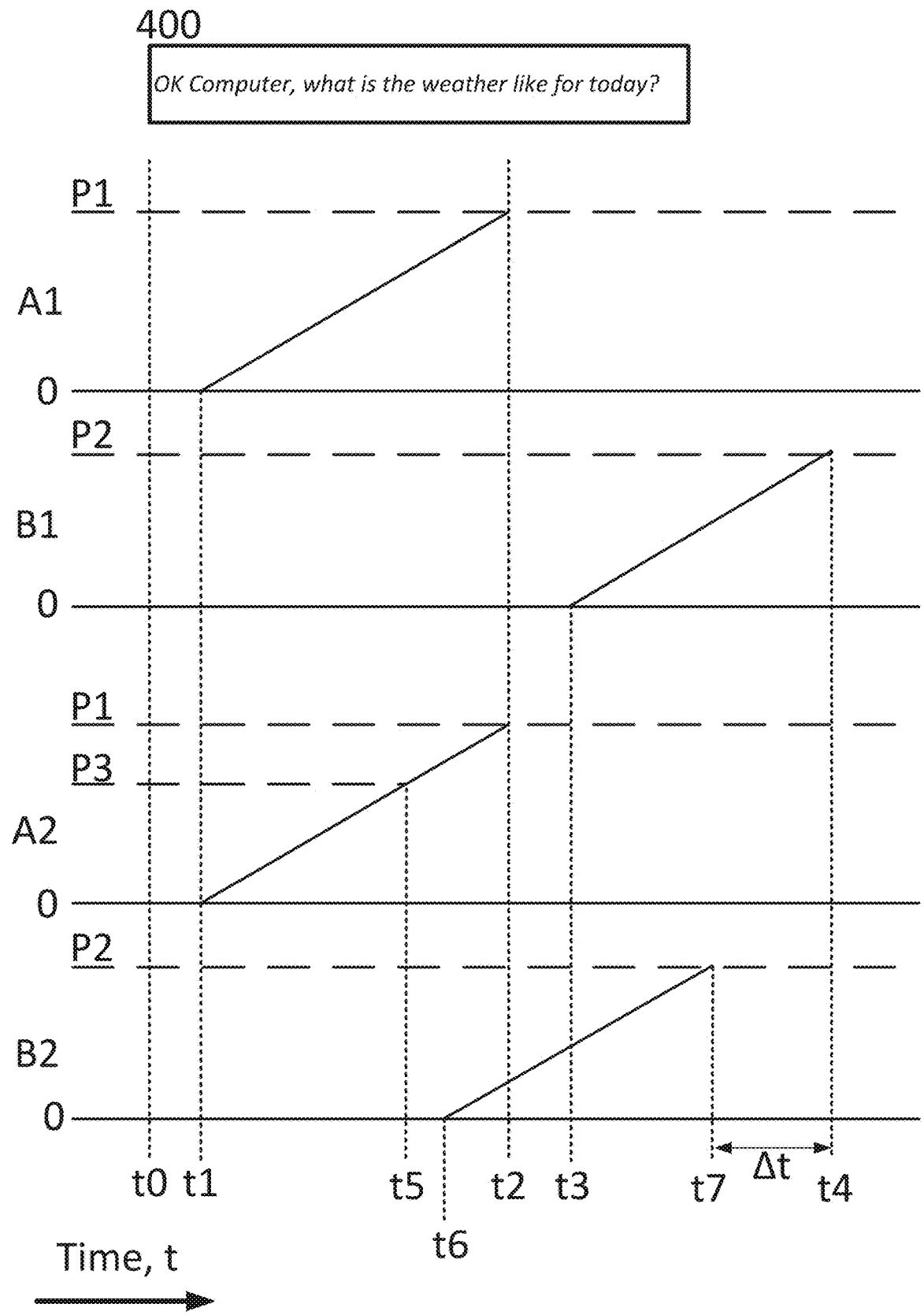
FIG. 17 is an example plot of the system outputs for a sequential speaker verification system and for a speculative-initiation speaker verification system.

An example of how such an embodiment may operate is provided in FIG. 17.

In FIG. 17, an example of received audio comprising speech is indicated at 400, with examples of the outputs of various biometric processes plotted over time in response the received speech. A1 is the output of a speaker verification process based on a first biometric process and B1 is the output of a speaker verification process based on a second biometric process, when configured in a purely sequential system. A2 is the output of a speaker verification process based on a first biometric process and B2 is the output of a speaker verification process based on a second biometric process, when configured in a system allowing for speculative initiation of the second biometric process.

For the sequential system, an audio sample 400 comprising a speech command ("OK Computer, what is the weather like for today?") is received at starting time t0, wherein the output A1 of the speaker verification process of the first biometric process performed on the audio 400 is tracked following time H. The first biometric process continues until the output reaches threshold P1 at time t2, indicating that a particular user has been identified. As described above, the initial identification of a user by the first biometric process is effectively used to power-gate the second biometric process. Accordingly, the output A2 of the speaker verification process of the second biometric process is tracked following time t3. The second biometric process continues until the output reaches threshold P2 at time t4, thereby indicating that the second biometric process has identified a user from the received audio. As described above, such an identification may be combined or fused with the output of the first biometric process, and/or may be used to trigger further downstream processing of the received audio or to allow the identified user authorised access to features or services.

In a system allowing for speculative initiation of the second biometric process, the speaker verification process of the first biometric process continues as before, producing output A2. However, once output A2 has reached a threshold level P3 at time t5, threshold P3 being less than threshold P1, the system is configured to initiate speculative processing of the second biometric process at time t6 closely after t5, which is indicated by the output B2 commencing at t6. In the embodiment shown, threshold P3 is selected to be equivalent to a threshold indicative of a probability level equivalent to 60% of P1 that a particular user has been identified, but it will be understood that other threshold levels may be chosen, e.g. 50% of P1, 75% of P1, etc.

The speaker verification process for the second biometric process continues as before until the defined threshold P2 for safely identifying a user is reached. However, due to the speculative initiation of the second biometric process at the earlier time t6, P2 can be reached at time t7, which is faster by time $\Delta t$ than the total time t4 taken by the sequential system. The time difference $\Delta t$ represents a reduction in the overall latency of the system by the use of such a speculative initiation process.

For the speculative initiation use-case, it will be understood that if the output A2 of the first biometric process later indicates at time t2 that the received audio is not from the previously-provisionally-identified user, and/or if the audio validation module of the first device indicates that the received audio 400 is not valid, e.g. due to a spoof detection or a speaker change detection, then the first device may be configured to instruct the second biometric process of the second device to halt any further processing at time t2, and any buffers or cache provided with the second biometric process cleared or reset for future operation.

It will be understood that speculatively initiating the second biometric process after the first biometric process has been running for time t5 (indicative of the time to reach the threshold P3), instead of the full time t2 (the time to reach the threshold P2) will result in the power-gating of the second process to be enabled based on a relatively weak first biometric process (effectively a process having a relatively high FAR and a relatively low FRR), with a more confident speaker validation of the received audio provided at time t2.

It will be understood that the above speculative initiation use-case may be implemented for any of the above-described embodiments, e.g. wherein the speaker verification process for the first biometric process is performed by the Vbio1 module 82, the Vbio1a module 120, or the speaker validation module 204, with the speaker verification process for the second biometric process performed by the appropriate Vbio2 module 84.

It will be further understood that the above comments regarding pre-processing module 80 may equally apply to the embodiments of FIGS. 12-16, i.e. that a pre-processing module may be used to provide a plurality of different signals to different processing modules of the system, e.g. a sampled or framed digital signal, a continuously-streamed digital signal, a continuously-streamed analog signal. As a result, the speaker validation module 204, the audio validation module 206, and/or the trigger detect module 210 may utilise one or more of the different signals in their respective processing systems.

In addition, it will be understood that the embodiments of FIGS. 12-16 may further comprise additional input data in the form of predefined characteristic information regarding the input 202 and/or a monitoring system configured to monitor the operational characteristics of the input 202. The processing modules of the validation module 204, the audio validation module 206, and/or the trigger detect module 210 may utilise such device-specific data in their respective processes, to account for device-specific characteristics and nonlinearities.

In a further aspect, while the above-described embodiments utilise a first voice biometric process as the first scoring system, it will be understood that the first voice biometric process may be replaced by any other suitable biometric process, for example an ear biometric process. For embodiments having an ear biometric process, it will be understood that the system may be provided with a plurality of microphones or audio transceivers, wherein at least one microphone or audio transceiver is configured to output an audio signal representing an audio response proximate to a user's ear.

Such an ear biometric process may be used to power gate the voice biometric process. The ear biometric process will be different to the voice biometric process, thereby providing individual discriminative results. Preferably the outputs of the ear biometric process and the voice biometric process may be combined or fused to provide an output to identify a user. In such an embodiment, it will be understood that the ear biometric process may be performed in a device such as a headset or earphone, with the voice biometric process performed in the same device, or in a coupled host device, e.g. a mobile phone handset. Alternatively, the ear biometric process and the voice biometric process may be performed in the same host device, e.g. a mobile phone handset. It will be understood that the first audio signal may comprise an ultrasonic audio signal and/or an audio signal in the audible range. An example of a system having both ear and voice biometric processes, and additionally where the outputs of such processes are fused, may be found in co-pending U.S. patent application Ser. No. 16/118,950, which is incorporated by reference herein.

Figure 18:
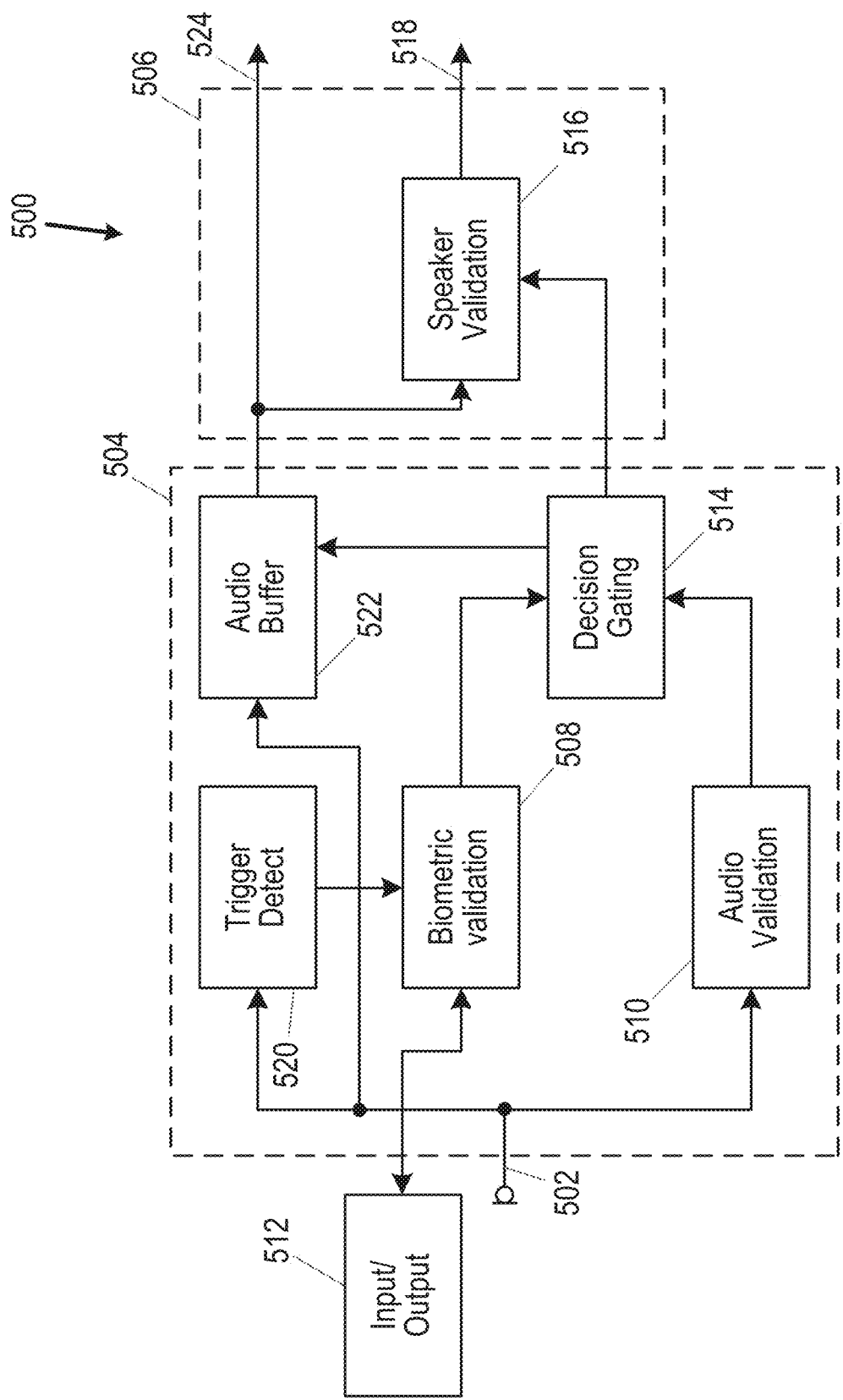
FIG. 18 illustrates an embodiment of a system in accordance with another embodiment.

FIG. 18 illustrates an embodiment of such a system.

Specifically, FIG. 18 shows a shows a speaker verification system 500, which receives audio comprising speech from an input 502 such as a high-resolution microphone. The system 500 comprises a first device 504 and a second device 506.

As described previously, the first device 504 may be an accessory device such as a headset or other wearable device, while the second device 506 is a host device such as a smartphone or other suitable device. In other embodiments, the first and second devices 504, 506 are separate integrated circuits within a product such as a smartphone, for example. The first and second devices 504, 506 may be supplied independently of each other. The form of the first device is not dependent on the form of the second device, and the form of the second device is not dependent on the form of the first device.

The first device 504 has some similarity to the device illustrated in FIG. 12, and is described in more detail above. Thus, the first device 504 comprises a first biometric validation module 508, and an audio validation module 510.

The first biometric validation module 508 is connected to an input and/or output module 512, and performs an initial user validation process, which results in an output in the form of a user ID score representing an initial likelihood that the user is a particular enrolled user. In general, the first biometric validation module 508 may operate with any suitable biometric, such as a retina scan, a fingerprint scan, an ear biometric, and a voice biometric. In addition, the first biometric validation module 508 may operate with any combination of suitable biometrics, with the scores generated by the different biometrics being combined, or fused, to produce a user ID score representing an initial likelihood that the user is a particular enrolled user. The input and/or output module 512 comprises suitable inputs and/or outputs for use with the first biometric validation module 508. For example, when the first biometric validation module 508 operates with a retina scan or a fingerprint scan, the input and/or output module 512 comprises a camera; when the first biometric validation module 508 operates with an ear biometric, the input and/or output module 512 comprises a microphone and a loudspeaker; and when the first biometric validation module 508 operates with a voice biometric, the input and/or output module 512 comprises at least a microphone.

More specifically, in one embodiment the first biometric validation module 508 is an ear biometric validation module. When the first biometric process is initiated, a signal is sent from the first biometric validation module 508 to the input/output module 512, causing a test acoustic signal to be generated in the region of a user's ear. The test acoustic signal may conveniently be an ultrasonic signal, for example in the region of 18 kHz to 48 kHz. The input/output module 512 may therefore include a loudspeaker, for example located in an earphone being worn by the user.

The input/output module 512 may also include a microphone, again for example located in an earphone being worn by the user, and positioned such that it can detect the test acoustic signal after it has been modified by its interaction with the ear of the user.

The signal detected by the microphone is then supplied to the first biometric validation module 508 for analysis. Specifically, the modification of the acoustic signal that is caused by the interaction with the ear of the user is compared with a model of the ear of one or more enrolled user, and the first biometric validation module 508 then generates one or more corresponding user ID score, representing an initial likelihood that the user is that enrolled user.

Meanwhile, the audio validation module 510 is configured to determine if the received audio is valid or invalid. In particular, the audio validation module 510 is configured to detect if the received audio is all from a single speaker, and/or to determine if the received audio is genuine audio, or is the product of a spoof or replay attack, wherein a hacker or other malicious actor is trying to deceive the speaker verification system 500. As described with reference to FIG. 14, the audio validation module 510 may include an anti-spoofing module and/or a speaker change detection module.

The output of the audio validation module 510 is used in a decision gating module 514, such that the output of the first device 504 is only allowed (a) when the first biometric validation module 508 has made an initial determination that the user is the enrolled user, and (b) when the audio validation module 510 has determined that the received audio is valid. Accordingly, the output of the audio validation module 510 is used to gate the output of the first biometric validation module 508 at the gating module 514.

Thus, the link between the first device 504 and the second device 506, which may be a wired or wireless link, is enabled only if the output of the first device 504 is allowed.

Gating the first biometric verification output by using an audio validity check to confirm that the received audio is valid ensures that the final speaker verification result is only used for audio which is not from a replay attack or a spoof attack, and additionally or alternatively, ensures that the received audio used in the speaker verification is from the same speaker, and is not from a combative or tail-gating attack.

The output of the decision gating module 514 may be used as an input to the second device 506, and more specifically to a speaker validation block 516, which operates with a relatively more discriminative secondary biometrics scoring process. In particular, the secondary biometric process may be a voice biometric process. The output of the decision gating module 514 may comprise the user ID score from the first biometric validation module 508, which may be fused with the output of the second biometric validation block 516 to produce an overall speaker verification output 518.

The voice biometric process performed by the speaker validation block 516 may be configured to be more discriminative than the ear biometric process or other biometric process performed by the first biometric validation block 508.

The system 500 may be provided, for example in the first device 504, with a trigger detection module 520, which is arranged to initialise the first biometric validation system 508 on detection of a suitable trigger. Such a trigger may comprise a voice keyword detected in the received audio, e.g. a trigger phrase such as "Hello Computer" or similar. Additionally or alternatively, the trigger detection may receive inputs from other sources, e.g. system inputs such as button presses, proximity detection, optical sensors, etc. which may be indicative of user interaction with the speaker verification system 500. In further embodiments, the trigger detection module 520 may itself comprise a "lightweight" biometric module, that is a low-power, but relatively non-discriminative biometric.

For example, the biometric process performed by the first biometric validation block 508 may be initiated only if the biometric process performed by the trigger detection module 520 indicates that an enrolled user may be speaking. For example, the biometric process performed by the trigger detection module 520 may comprise confirming whether the main frequency component of the detected speech (for example, when a predetermined trigger phrase is detected) is consistent with the expected enrolled user.

In an additional aspect, the system 500 may be provided, for example in the first device 504 as shown in FIG. 18 (though it may be in the second device 506 or elsewhere in a device such as a smartphone) with an audio buffer 522 arranged to buffer the audio received from the input 502. Such a buffer 522 may be used as described in the above embodiments, wherein the buffered audio may be provided to the second biometrics module 516 for further processing. The output of the buffer 522 may be controlled by the gating module 514, such that data is only sent for further processing when it is determined that the received audio is valid, and when the first biometric validation module 508 has determined that the user is an enrolled user. By outputting the buffered audio on an output 524 along with a valid speaker recognition output, further processing of the received audio may be performed, with an initial determination that the received audio is that of a particular speaker. Such additional processing may comprise speech recognition of the received audio for use in command processing, or the received audio may be processed using a more discriminative speaker recognition process, for example for relatively high security operations.

It will be understood that the details of the above-described embodiments may also apply to embodiments wherein the first voice biometric process is replaced by any other suitable biometric process, and not necessarily an ear biometric process.

In a further aspect of the invention, the system may be configured to allow partial access to services, functions, or stored data of a device based on the output of the first biometric process, with complete access to all services, functions, or stored data only allowed based on the output of the second biometric process. For example, in embodiments having speculative automatic speech recognition (ASR) for voice command processing, where ASR may be performed to identify user voice commands in parallel with the first biometric process to identify a user, access to relatively low-security or low-sensitivity services or applications may be enabled based on the output of the first biometric process, and commands relating to such services may be executed after ASR processing has identified an appropriate command relating to such services.

For example, a mobile phone device may allow commands relating to the operation of music services or information queries such as weather forecasting applications to be performed based on the output of the first biometric process. However, when the commands relate to relatively high-security or high-sensitivity services, e.g. banking applications, personal data, etc., then access may be enabled or commands acted upon only when the second biometric process has provided a positive user identification.

Allowing for such speculative execution of commands relating to some applications based on the first biometric process may act to reduce latency and provide improved user interaction of the device, while preserving the relatively high security requirements for relatively sensitive applications, where a user may be less concerned about responsiveness as long as the high security access level is maintained.

In a further aspect of the invention, the system may be configured to provide for different bandwidths or sample rates between the first and second devices.

The system may be configured to vary the sample rates between processes. For example, speech used in an Automatic Speech Recognition (ASR) process may have a lower bandwidth requirement than speech used in a voice biometrics process, which may itself have a lower bandwidth requirement when compared with a high-accuracy anti-spoofing process. Preferably, an ASR process may be provided with an audio signal having a sample rate of approximately 8 kHz, a voice biometrics process may be provided with an audio signal having a sample rate of approximately 16 kHz; and an anti-spoofing process may be provided with an audio signal having a sample rate of approximately 192 kHz.

Figure 19:
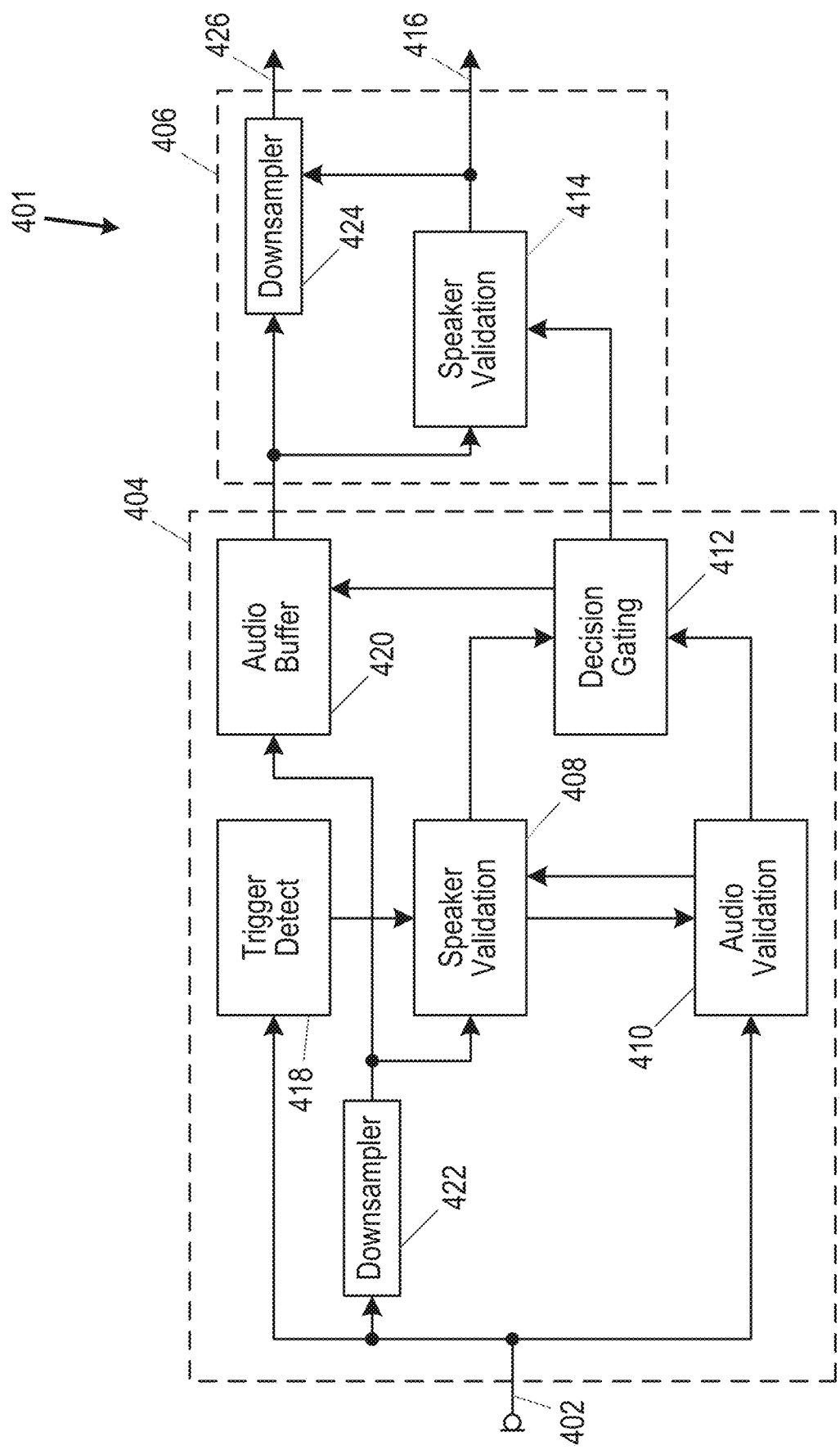
FIG. 19 illustrates an embodiment of a system in accordance with another embodiment.

FIG. 19 illustrates an embodiment of such a system.

Specifically, FIG. 19 shows a speaker verification system 401, which receives audio comprising speech from an input 402 such as a high-resolution microphone that is capable of generating signals with a high sample rate such as 192 kHz, or any other suitable interface or audio transceiver for receiving audio signals. The system 401 comprises a first device 404 and a second device 406.

As described previously, the first device 404 may be an accessory device such as a headset or other wearable device, while the second device 406 is a host device such as a smartphone or other suitable device. In other embodiments, the first and second devices 404, 406 are separate integrated circuits within a product such as a smartphone, for example. The first and second devices 404, 406 may be supplied independently of each other. The form of the first device is not dependent on the form of the second device, and the form of the second device is not dependent on the form of the first device.

The first device 404 is generally similar to the device illustrated in FIG. 12, and described in more detail above. Thus, the first device 404 comprises a speaker validation module 408, and an audio validation module 410. The speaker validation module 408 performs an initial speaker validation process on the received audio from the input 402, and provides outputs in the form of a speaker ID score representing an initial likelihood that the received speech is from a particular speaker and a sound classification representing the likelihood that the received speech is a particular acoustic class.

The audio validation module 410 is configured to determine if the received audio is valid or invalid. In particular, the audio validation module 410 is configured to detect if the received audio is all from a single speaker, and/or to determine if the received audio is genuine audio, or is the product of a spoof or replay attack, wherein a hacker or other malicious actor is trying to deceive the speaker verification system 401. The speaker validation module 408 is coupled with the audio validation module 410, such that the audio validation module 410 makes the determination on whether the received audio is valid or invalid based at least in part on the output of the speaker validation module 408. In particular, the output of the audio validation module 410 is based at least in part on the sound classification representing the likelihood that the received speech is a particular acoustic class, which is output by the speaker validation module 408. By using the sound classification output from the speaker verification process in the audio validation process, accordingly the resources required for such an audio validation process may be minimised, and associated latency reduced.

The output of the audio validation module 410 is used in a decision gating module 412, such that the output of the first device 404 is only allowed (a) when the speaker validation module 408 has made an initial determination that the received speech is the speech of an enrolled user, and (b) when the audio validation module 410 has determined that the received audio is valid. Accordingly, the output of the audio validation module 410 is used to gate the output of the speaker validation module 408 at the gating module 412. Gating the speaker verification output by using an audio validity check to confirm that the received audio is valid ensures that the speaker verification result is only used for audio which is not from a replay attack or a spoof attack, and additionally or alternatively, ensures that the received audio used in the speaker verification is from the same speaker, and is not from a combative or tail-gating attack.

The output of the decision gating module 412 may be used as an input to the second device 406, and more specifically to a speaker validation block 414, which operates with a relatively more discriminative secondary biometrics scoring process. The output of the decision gating module 412 may comprise the speaker ID score from the speaker validation module 408, which may be fused with the output of the second speaker validation block 414 to produce an overall speaker verification output 416.

The system 401 may be provided, for example in the first device 404, with a trigger detection module 418, which is arranged to initialise the speaker validation system 408 on detection of a suitable trigger. Such a trigger may comprise a voice keyword detected in the received audio, e.g. a trigger phrase such as "Hello Computer" or similar. Additionally or alternatively, the trigger detection may receive inputs from other sources, e.g. system inputs such as button presses, proximity detection, optical sensors, etc. which may be indicative of user interaction with the speaker verification system 401.

In an additional aspect, the system 401 may be provided, for example in the first device 404 as shown in FIG. 19 (though it may be in the second device 406 or elsewhere in a device such as a smartphone) with an audio buffer 420 arranged to buffer the audio received from the input 402. Such a buffer 420 may be used as described in the above embodiments, wherein the buffered audio may be provided to the second biometrics module 414 for further processing. The output of the buffer 420 may be controlled by the gating module 412, such that data is only sent for further processing when it is determined that the received audio is valid, and that the speaker validation module 408 has determined that the received audio comprises speech from an enrolled user. By outputting the buffered audio along with a valid speaker recognition output, accordingly further processing of the received audio may be performed, with an initial determination that the received audio is that of a particular speaker. Such additional processing may comprise speech recognition of the received audio for use in command processing, or the received audio may be processed using a more discriminative speaker recognition process, for example for relatively high security operations.

As mentioned above, the first device 404 may be configured to receive an input signal having a relatively high sample rate, and therefore a relatively high bandwidth. Such a high bandwidth signal may be required by an anti-spoofing module, for example if the anti-spoofing module is configured for identifying the presence or absence of ultrasonic frequencies in the received audio, and using the presence or absence of the ultrasonic frequencies as an indication as to whether the audio signal results from a replay attack.

Such a high sample rate is not usually required for a voice biometrics process, and therefore FIG. 19 shows that the input signal is applied to a downsampler 422, and it is the decimated or downsampled version of the input signal that is passed to the speaker validation block 408, and also to the audio buffer 420.

One possibility is that, for example if the speaker verification system 401 determines that the person speaking is a properly enrolled speaker, the audio signal may be passed to downstream processing components. For example, the audio signal may be passed to an automatic speech recognition (ASR) system, which identifies the content of the speech, by contrast with a speaker recognition system, which provides information about a person who is speaking.

An ASR system may operate with a signal having a sample rate even lower than that required by a voice biometrics system, and therefore the output of the audio buffer 420 may be passed to a second downsampler 424 before it is supplied on an output 426 to a subsequent processing block that performs the ASR process. The subsequent processing block that performs the ASR process may be provided in the same product as the first device 404 and/or the second device 406, or it may be provided remotely.

The supply of the further downsampled or decimated signal on the output 426 may be controlled such that a signal is only supplied to the subsequent processing block if the second speaker validation process has confirmed that the person speaking is a properly enrolled speaker.

Thus, the first device may perform a decimation of the sample rate of the received audio, wherein the second device is configured to process the decimated version of the received audio. The decimation may be adjustable based on input received from downstream processing components, e.g. sample rate requirements for processing operations performed by the downstream components. A reduced bandwidth or sample rate between modules or devices can provide improved overall system efficiency due to a reduction in power consumption of the system, for example when the first device is located separate to the second device, and connected using e.g. a wireless data link, a reduction in the bandwidth of data to be communicated via said link can provide improvements to the power consumption and battery life of such devices.

Additionally or alternatively, the first device may be configured to not initialise communications links between the first and second devices if the audio is not verified or validated by the system of the first device, e.g. not initialise a wireless communications modem within the first device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A speaker verification method to provide a speaker verification output comprising the steps of:
 receiving audio comprising speech;
 performing a speaker verification process on the received audio, the speaker verification process comprising:
  (i) determining a speaker ID score representing the likelihood that the received speech is from a particular speaker, and
  (ii) determining a sound classification representing a distribution of acoustic classes detected in the speech of the received audio;
 performing an audio validation process on the received audio to generate an output indicating a validity of the received audio, the audio validation process comprising a speaker change detection (SCD) process comprising:
  monitoring for a change in the distribution of acoustic classes identified from the sound classification; and
  invalidating the received audio if a change is detected; and
 gating the output of the speaker verification process based on the output of the audio validation process, such that the speaker ID score is output only for valid received audio.

2. The method of claim 1, wherein the audio validation process is additionally based at least in part on the speaker ID score from the speaker verification process.

3. The method of claim 1, wherein the step of performing an audio validation process comprises:

performing an anti-spoofing (AS) process based on the received audio and the sound classification.

4. The method of claim 3, wherein the anti-spoofing process comprises at least one of the following:
an anti-spoofing method using received audio and an indication of the acoustic classes present in speech;
an ultrasonic-power-level-based anti-spoofing system;
a magnetic-power-level-based anti-spoofing system; and
a loudspeaker-detection-based anti-spoofing system.

5. The method of claim 4, comprising performing multiple different anti-spoofing processes, and combining or fusing the outputs of such different anti-spoofing processes to provide an anti-spoofing decision.

6. The method of claim 1, wherein the step of performing an audio validation process comprises:
performing the SCD process based on a combination of at least one or more of the following: the speaker ID score; the sound classification; the received audio.

7. The method of claim 6, wherein the audio validation process is configured to generate an output indicating that a part of the received audio preceding a speaker change is valid.

8. The method of claim 6, wherein the SCD process is based on at least one of the following:
a time-windowed speaker ID score;
monitoring for a change in the fundamental frequency, or F0, of the received audio;
monitoring for a change in the fundamental frequency of the received audio for a particular acoustic class identified from the sound classification;
accent tracking;
emotion tracking; or
any other suitable speaker change detection method.

9. The method of claim 6, comprising performing multiple different SCD processes, and combining or fusing the outputs of such different SCD processes to provide an SCD decision.

10. The method of claim 6, wherein an output of the audio validation process is used as an input to the speaker verification process.

11. The method of claim 1, wherein the method further comprises the steps of:
buffering the received audio; and
responsive to the step of gating the output of the speaker verification process, outputting the valid speaker recognition output and the buffered audio.

12. The method of claim 1, wherein the step of performing a speaker recognition process comprises:
performing a plurality of different speaker recognition processes to provide a respective plurality of speaker recognition scores, and
fusing the plurality of speaker recognition scores to provide the speaker ID score.

13. The method of claim 1, wherein the step of performing a speaker recognition process comprises the steps of:
performing a classification of the received audio to identify a sound classification, the sound classification identifying acoustic classes present in the received audio; and
based on the identified sound classification, scoring the received audio against a stored template of the acoustic classes produced by enrolled speakers to identify a speaker for the received audio from the enrolled speakers.

14. The method of claim 1, wherein the step of performing a speaker recognition process is performed responsive to receipt of a trigger signal, for example a keyword detection.

15. The method of claim 14, wherein the method comprises the step of monitoring for a trigger signal, for example performing a voice keyword detection process.

16. A speaker recognition method comprising the steps of:
performing at least a portion of the method according to claim 1 as part of a primary biometrics scoring; and
performing a secondary biometrics scoring based on the received audio to provide a second speaker ID score, the secondary biometrics scoring performed responsive to the step of gating of a speaker verification output for valid received audio from the primary biometrics scoring,
wherein the secondary biometrics scoring is selected to be different to the primary biometrics scoring.

17. The method of claim 16, wherein the method comprises the step of fusing the speaker ID score from the primary biometrics scoring with the second speaker ID score of the secondary biometrics scoring to provide a speaker authentication result.

18. The method of claim 16, wherein the speaker recognition method is configured such that:
the primary biometrics scoring is selected to have a relatively high False Acceptance Rate (FAR), and a relatively low False Rejection Rate (FRR).

19. The method of claim 18, wherein:
the secondary biometrics scoring is selected to have a relatively lower FAR than the primary biometrics scoring.

20. A speaker verification system to provide a speaker verification output, the system comprising:
an input for receiving an audio signal comprising speech;
a speaker verification module coupled with the input, the speaker verification module arranged to:
(i) determine a speaker ID score representing the likelihood that the received speech is from a particular speaker, and
(ii) determine a sound classification representing a distribution of acoustic speech classes detected in the speech of the received audio;
an audio validation module coupled with the input and the speaker verification module, the audio validation module arranged to generate an output indicating a validity of the received audio, the audio validation module arranged to perform a speaker change detection (SCD) process comprising:
monitoring for a change in the distribution of acoustic classes identified from the sound classification; and
invalidating the received audio if a change is detected; and
a gating module configured to gate the output of the speaker verification module based on the output of the audio validation module, such that the speaker ID score is output only for valid received audio.

* * * * *

UNITED STATES PATENT AND TRADEMARK OFFICE
CERTIFICATE OF CORRECTION

PATENT NO. : 11,735,189 B2
APPLICATION NO. : 16/255390
DATED : August 22, 2023
INVENTOR(S) : John Paul Lesso Page 1 of 1

It is certified that error appears in the above-identified patent and that said Letters Patent is hereby corrected as shown below:

In the Specification

1. In Column 9, Line 8, delete "Nerve." and insert -- Herve. --, therefor.

2. In Column 20, Line 46, delete "$S_T=aS_1+(1-\alpha)S_2$." and insert -- $S_T = \alpha S_1 + (1-\alpha) S_2$. --, therefor.

3. In Column 30, Line 51, delete "Nerve." and insert -- Herve. --, therefor.

4. In Column 34, Line 26, delete "time H." and insert -- time t1. --, therefor.

Signed and Sealed this
Twenty-sixth Day of November, 2024

Katherine Kelly Vidal
*Director of the United States Patent and Trademark Office*